United States Patent
Loukus et al.

(10) Patent No.: US 10,179,364 B2
(45) Date of Patent: Jan. 15, 2019

(54) THERMAL ISOLATION FOR CASTING ARTICLES

(71) Applicant: REL, Inc., Calumet, MI (US)

(72) Inventors: Josh E. Loukus, Calumet, MI (US); Adam R. Loukus, Calumet, MI (US)

(73) Assignee: REL, INC., Calumet, MI (US)

( * ) Notice: Subject to any disclaimer, the term of this patent is extended or adjusted under 35 U.S.C. 154(b) by 0 days.

(21) Appl. No.: 14/935,068

(22) Filed: Nov. 6, 2015

(65) Prior Publication Data

US 2016/0059305 A1    Mar. 3, 2016

Related U.S. Application Data

(63) Continuation of application No. 13/840,423, filed on Mar. 15, 2013, now Pat. No. 9,180,511.

(Continued)

(51) Int. Cl.
*B22C 9/00* (2006.01)
*B22D 27/04* (2006.01)
(Continued)

(52) U.S. Cl.
CPC ............... *B22D 27/04* (2013.01); *B22C 9/00* (2013.01); *B22D 17/00* (2013.01); *B22D 17/203* (2013.01);
(Continued)

(58) Field of Classification Search
CPC .. B22C 3/00; B22C 9/00; B22D 27/04; B22D 17/00; B22D 19/0081; B22D 19/02;
(Continued)

(56) References Cited

U.S. PATENT DOCUMENTS 2,426,988 A    9/1947 Dean
3,230,056 A    1/1966 Arant et al.
(Continued)

FOREIGN PATENT DOCUMENTS

CA    1128255    7/1982
CA    1294754    1/1992
(Continued)

OTHER PUBLICATIONS

"Communication Pursuant to Rules 161(1) and 162 EPC," for European Patent Application No. 13718691.2, dated Dec. 16, 2014 (2 pages).

(Continued)

*Primary Examiner* — Kevin P Kerns
*Assistant Examiner* — Steven S Ha
(74) *Attorney, Agent, or Firm* — Device Patent LLC

(57) ABSTRACT

Some embodiments provide methods and systems for casting articles. One example of a method includes providing and positioning a thermal blanket within a mold cavity and then introducing a molten material into the mold cavity and into contact with the thermal blanket. The method allows the molten material to remain in a molten state during a dwell time that extends from the introduction of the molten material at least until the mold cavity is filled. In another example, a method of using a thermal blanket includes keeping a molten material in a molten state during a dwell time extending from first introduction of the molten material until pressurization. Systems including a variety of mold types, one or more thermal blankets, and in some cases preforms and/or inserts are also provided. Also described is a novel thermal blanket and method of manufacturing the same.

21 Claims, 12 Drawing Sheets

Related U.S. Application Data

(60) Provisional application No. 61/623,532, filed on Apr. 12, 2012, provisional application No. 61/690,727, filed on Jul. 3, 2012.

(51) Int. Cl.

| | |
|---|---|
| *B22D 17/00* | (2006.01) |
| *B22D 19/00* | (2006.01) |
| *B22D 19/02* | (2006.01) |
| *B22D 19/08* | (2006.01) |
| *B22D 19/14* | (2006.01) |
| *C04B 30/02* | (2006.01) |
| *B22D 17/20* | (2006.01) |
| *B22D 17/22* | (2006.01) |
| *C04B 111/00* | (2006.01) |

(52) U.S. Cl.
CPC ......... *B22D 17/2023* (2013.01); *B22D 17/22* (2013.01); *B22D 19/0081* (2013.01); *B22D 19/02* (2013.01); *B22D 19/08* (2013.01); *B22D 19/14* (2013.01); *C04B 30/02* (2013.01); *C04B 2111/00525* (2013.01); *C04B 2111/00577* (2013.01); *Y10T 428/24926* (2015.01)

(58) Field of Classification Search
CPC ...... B22D 19/18; B22D 19/14; B22D 17/203; B22D 17/22
See application file for complete search history.

(56) References Cited

U.S. PATENT DOCUMENTS

| | | | |
|---|---|---|---|
| 3,387,646 A | 6/1968 | Lauth | |
| 3,472,308 A | 10/1969 | Lauth | |
| 3,622,404 A | 11/1971 | Thompson | |
| 3,702,279 A | 11/1972 | Ardary et al. | |
| 3,736,448 A | 5/1973 | Hebel et al. | |
| 3,741,820 A | 6/1973 | Hebel | |
| 3,911,997 A | 10/1975 | Sugazawa | |
| 4,136,455 A | 1/1979 | Owsen | |
| 4,232,091 A | 11/1980 | Grimshaw et al. | |
| 4,254,621 A | 3/1981 | Nagumo | |
| 4,264,052 A | 4/1981 | Radtke et al. | |
| 4,283,847 A | 8/1981 | May | |
| 4,393,100 A | 7/1983 | Potter | |
| 4,404,262 A | 9/1983 | Watmough | |
| 4,416,174 A | 11/1983 | Owsen | |
| 4,425,411 A * | 1/1984 | Textor | B22C 23/02 106/38.9 |
| 4,546,048 A | 10/1985 | Guenther | |
| 4,575,394 A | 3/1986 | Nixon | |
| 4,650,775 A | 3/1987 | Hill et al. | |
| 4,664,704 A | 5/1987 | Dohnomoto et al. | |
| 4,667,727 A | 5/1987 | Barlow et al. | |
| 4,679,493 A | 7/1987 | Munro et al. | |
| 4,715,422 A | 12/1987 | Tommis et al. | |
| 4,751,205 A | 6/1988 | Hill et al. | |
| 4,770,707 A | 9/1988 | Smith | |
| 4,799,531 A | 1/1989 | Yamamoto et al. | |
| 4,802,425 A | 2/1989 | Dickson | |
| 4,899,800 A | 2/1990 | Gallerneault et al. | |
| 4,921,669 A | 5/1990 | Vetter et al. | |
| 4,968,359 A | 11/1990 | Hebel | |
| 4,995,444 A | 2/1991 | Jolly et al. | |
| 5,033,532 A * | 7/1991 | Aoyama | B22D 27/09 164/120 |
| 5,047,289 A | 9/1991 | Tsuchiya et al. | |
| 5,089,072 A | 2/1992 | Carson | |
| 5,102,745 A | 4/1992 | Tatarchuk et al. | |
| 5,242,512 A | 9/1993 | Bagley et al. | |
| 5,252,152 A | 10/1993 | Seror | |
| 5,373,630 A | 12/1994 | Lucier et al. | |
| 5,373,632 A | 12/1994 | Lucier et al. | |
| 5,394,930 A | 3/1995 | Kennerknecht | |
| 5,421,087 A | 6/1995 | Newkirk et al. | |
| 5,427,853 A | 6/1995 | Powell et al. | |
| 5,511,603 A | 4/1996 | Brown et al. | |
| 5,520,861 A | 5/1996 | Powell et al. | |
| 5,524,696 A | 6/1996 | Osborne et al. | |
| 5,553,658 A | 9/1996 | Cornie | |
| 5,569,422 A | 10/1996 | Astier et al. | |
| 5,588,477 A | 12/1996 | Sokol et al. | |
| 5,657,795 A | 8/1997 | Sawko et al. | |
| 5,679,041 A | 10/1997 | Sokol et al. | |
| 5,693,274 A | 12/1997 | Kim | |
| 5,700,409 A | 12/1997 | Corry | |
| 5,755,272 A | 5/1998 | Mortensen et al. | |
| 5,836,682 A | 11/1998 | Blach et al. | |
| 5,980,792 A | 11/1999 | Chamlee | |
| 5,983,973 A | 11/1999 | Cornie | |
| 6,190,031 B1 | 2/2001 | Blach et al. | |
| 6,196,711 B1 | 3/2001 | Blach et al. | |
| 6,227,693 B1 | 5/2001 | Blach et al. | |
| 6,293,680 B1 | 9/2001 | Bruns | |
| 6,318,442 B1 | 11/2001 | Cornie | |
| 6,375,877 B2 | 4/2002 | Lauf et al. | |
| 6,733,628 B2 | 5/2004 | Dinwoodie et al. | |
| 7,025,491 B2 | 4/2006 | Blach et al. | |
| 7,048,034 B2 | 5/2006 | Vandermeer et al. | |
| 7,137,675 B1 | 11/2006 | Simula et al. | |
| 7,160,503 B2 | 1/2007 | Weaver | |
| 7,175,722 B2 | 2/2007 | Walker | |
| 7,270,471 B2 | 9/2007 | Blach | |
| 7,284,897 B2 | 10/2007 | Blach | |
| 7,360,386 B2 | 4/2008 | Bair | |
| 7,425,090 B2 | 9/2008 | Blach | |
| 7,481,144 B2 | 1/2009 | Simula et al. | |
| 7,594,453 B2 | 9/2009 | Blach | |
| 7,654,726 B2 | 2/2010 | Blach | |
| 9,180,511 B2 | 11/2015 | Loukus et al. | |
| 2002/0088599 A1 | 7/2002 | Davis et al. | |
| 2003/0019604 A1 | 1/2003 | Ishiduka et al. | |
| 2003/0034145 A1 | 2/2003 | Ishiduka et al. | |
| 2003/0097752 A1 | 5/2003 | Shirk et al. | |
| 2003/0141032 A1 | 7/2003 | Singer et al. | |
| 2004/0035547 A1 | 2/2004 | Grether | |
| 2004/0089435 A1 | 5/2004 | Wang | |
| 2004/0163791 A1* | 8/2004 | Hara | B22D 39/026 164/136 |
| 2005/0026818 A1 | 2/2005 | Fatheree et al. | |
| 2005/0037215 A1 | 2/2005 | Ishiduka et al. | |
| 2005/0100724 A1 | 5/2005 | Seargeant | |
| 2005/0183909 A1 | 8/2005 | Rau et al. | |
| 2005/0217950 A1 | 10/2005 | Jolley et al. | |
| 2005/0284602 A1 | 12/2005 | Kaba et al. | |
| 2006/0021731 A1 | 2/2006 | Strangman et al. | |
| 2006/0283920 A1 | 12/2006 | Chitty | |
| 2007/0031164 A1 | 2/2007 | Ota | |
| 2007/0040005 A1 | 2/2007 | Iordache et al. | |
| 2007/0044443 A1 | 3/2007 | Nixdorf et al. | |
| 2007/0064222 A1 | 3/2007 | Schlachter | |
| 2007/0137827 A1 | 6/2007 | Vogt et al. | |
| 2008/0092725 A1 | 4/2008 | Simula et al. | |
| 2008/0105339 A1 | 5/2008 | Walker | |
| 2008/0119559 A1 | 5/2008 | Weissbach et al. | |
| 2008/0119560 A1 | 5/2008 | Old et al. | |
| 2008/0259717 A1 | 10/2008 | Blach | |
| 2009/0040863 A1 | 2/2009 | Blach | |
| 2009/0135625 A1 | 5/2009 | Yang et al. | |
| 2009/0274003 A1 | 11/2009 | Blach | |
| 2009/0309252 A1 | 12/2009 | Schuetz et al. | |
| 2009/0309262 A1 | 12/2009 | Mccullough et al. | |
| 2009/0311541 A1 | 12/2009 | Wood et al. | |
| 2009/0312174 A1 | 12/2009 | Mccullough et al. | |
| 2010/0001231 A1 | 1/2010 | Loukus et al. | |
| 2010/0067320 A1 | 3/2010 | Blach et al. | |

(56) References Cited

U.S. PATENT DOCUMENTS

| | | | |
|---|---|---|---|
| 2013/0269901 A1 | 10/2013 | Loukus et al. | |
| 2013/0269902 A1 | 10/2013 | Loukus et al. | |

FOREIGN PATENT DOCUMENTS

| | | | | |
|---|---|---|---|---|
| DE | 2431536 | | 1/1976 | |
| DE | 19937798 | | 3/2001 | |
| EP | 0151952 | | 8/1985 | |
| EP | 0230192 | | 7/1987 | |
| EP | 271222 | | 6/1988 | |
| EP | 2836320 | | 2/2015 | |
| EP | 2836321 | | 2/2015 | |
| GB | 1031587 | | 6/1966 | |
| GB | 1031587 A | * | 6/1966 | ............... B22C 3/00 |
| GB | 1240301 | | 7/1971 | |
| GB | 2079401 | | 1/1982 | |
| GB | 2106433 | | 4/1983 | |
| JP | 48102724 | | 12/1973 | |
| JP | 5815743 | | 1/1983 | |
| JP | 62202941 | | 12/1987 | |
| JP | 63036959 | | 3/1988 | |
| JP | 63260655 | | 10/1988 | |
| JP | 63268551 | | 11/1988 | |
| JP | 01299752 | | 12/1989 | |
| JP | 03057551 | | 3/1991 | |
| JP | 05177336 | | 7/1993 | |
| JP | 11077240 | | 3/1999 | |
| JP | 11267817 | | 10/1999 | |
| JP | 2003112242 | | 4/2003 | |
| JP | 2008188620 | | 8/2008 | |
| JP | 2015512788 | | 4/2015 | |
| JP | 2015512789 | | 4/2015 | |
| WO | 2000056481 | | 9/2000 | |
| WO | 2013155131 | | 10/2013 | |
| WO | 2013155132 | | 10/2013 | |

OTHER PUBLICATIONS

"Communication Pursuant to Rules 161(1) and 162 EPC," for European Patent Application No. 13718692.0, dated Dec. 16, 2014 (2 pages).
"File History," for U.S. Appl. No. 13/836,001 downloaded Mar. 15, 2016 (336 pages).
"International Preliminary Report on Patentability," for PCT Application No. PCT/US2013/035890, dated Oct. 23, 2014 (11 pages).
"International Preliminary Report on Patentability," for PCT Application No. PCT/US2013/035892, dated Oct. 23, 2014 (11 pages).
"International Search Report and Written Opinion," for PCT/US2013/035890 dated Nov. 29, 2013 (17 pages).
"International Search Report and Written Opinion," for PCT/US2013/035892 dated Nov. 29, 2013 (16 pages).
"Morgan ThermalCeramics Kaowool Blanket S/Kaowool Blanket SZr," Datasheet Code 5-7-12 E, MSDS Code 104-9-EURO REACH, copyright 2009 (3 pages).
"Office Action," for Canadian Patent Application No. 2,870,311 dated Dec. 4, 2015 (6 pages).
"Office Action," for Canadian Patent Application No. 2,870,759 dated Dec. 3, 2015 (4 pages).
"Response to Communication Pursuant to Rules 161 and 162 EPC," for European Patent Application No. 13718691.2, filed Jun. 22, 2015 (33 pages).
"Response to Communication Pursuant to Rules 161(1) and 162 EPC," for European Patent Application No. 13718692.0, filed Jun. 23, 2015 (34 pages).
"Response to Office Action," for Canadian Patent Application No. 2,870,311 filed with CIPO Mar. 4, 2016 (35 pages).
"Response to Office Action," for Canadian Patent Application No. 2870759, filed with CIPO Mar. 3, 2016 (35 pages).
"Supplemental Response to Office Action," for Canadian Patent Application No. 2,870,759 filed with CIPO Mar. 7, 2016 (13 pages).
"Final Office Action," for U.S. Appl. No. 13/836,001 dated Sep. 9, 2016 (29 pages).
"Non Final Office Action," for Japanese Patent Application No. 2015-505862, dated Sep. 30, 2016 (16 pages) with English Translation.
"Non Final Office Action," for Japanese Patent Application No. 2015-505863, dated Sep. 30, 2016 (14 pages) with English translation.
Office Action for Canadian Patent Application No. 2,870,311, dated Sep. 15, 2016 (4 pages).
Response to Office Action for Canadian Patent Application No. 2,870,311, filed with CIPO Aug. 2, 2016 (4 pages).
Response to Office Action for Canadian Patent Application No. 2,871,759, filed with the Canadian Patent Office Jul. 27, 2016 (9 pages).
"Accuratus," Boron Nitride, BN Ceramic Properties retrieved from http://accuratus.com/boron.html on Jun. 20, 2016, 4 pages.
"Dycote," Dycote Product Manual, 4 pages. May 2011.
Office Action for Canadian Patent Application No. 2,870,311, dated May 2, 2016 (4 pages).
Office Action for Canadian Patent Application No. 2,870,759 dated Apr. 27, 2016 (5 pages).
Response to Non-Final Office Action for U.S. Appl. No. 13/836,001, dated Dec. 24, 2015 and filed with the USPTO Jun. 24, 2016 (11 pages).
"Squeeze-Rite 424," Squeeze Casting Lubricant Technical Data Sheet, Apr. 5, 2012, 1 page.
Response to Office Action for Canadian Patent Application No. 2,870,311, filed with CIPO Mar. 14, 2017 (10 pages).
Communication Pursuant to Article 94(3) EPC for European Patent Application No. 13718691.2 dated Nov. 4, 2016 (4 pages).
Office Action for Canadian Patent Application No. 2,870,759 dated Sep. 7, 2016 (3 pages).
Communication Pursuant to Article 94(3) EPC for European Patent Application No. 13718692.0 dated Nov. 16, 2016 (4 pages).
Office Action for Canadian Patent Application No. 2,870,759 dated Jan. 19, 2017 (3 pages).
Response to Communication Pursuant to Article 94(3) EPC for European Patent Application No. 13718691.2 filed with the EPO Dec. 6, 2016 (27 pages).
Response to Communication Pursuant to Article 94(3) EPC for European Patent Application No. 13718692.0, filed Feb. 2, 2017 (20 pages).
Response to Office Action for Canadian Patent Application No. 2,870,759, filed with CIPO Feb. 13, 2017 (9 pages).
Response to Office Action for Canadian Patent Application No. 2870759, filed with CIPO Dec. 7, 2016 (18 pages).

* cited by examiner

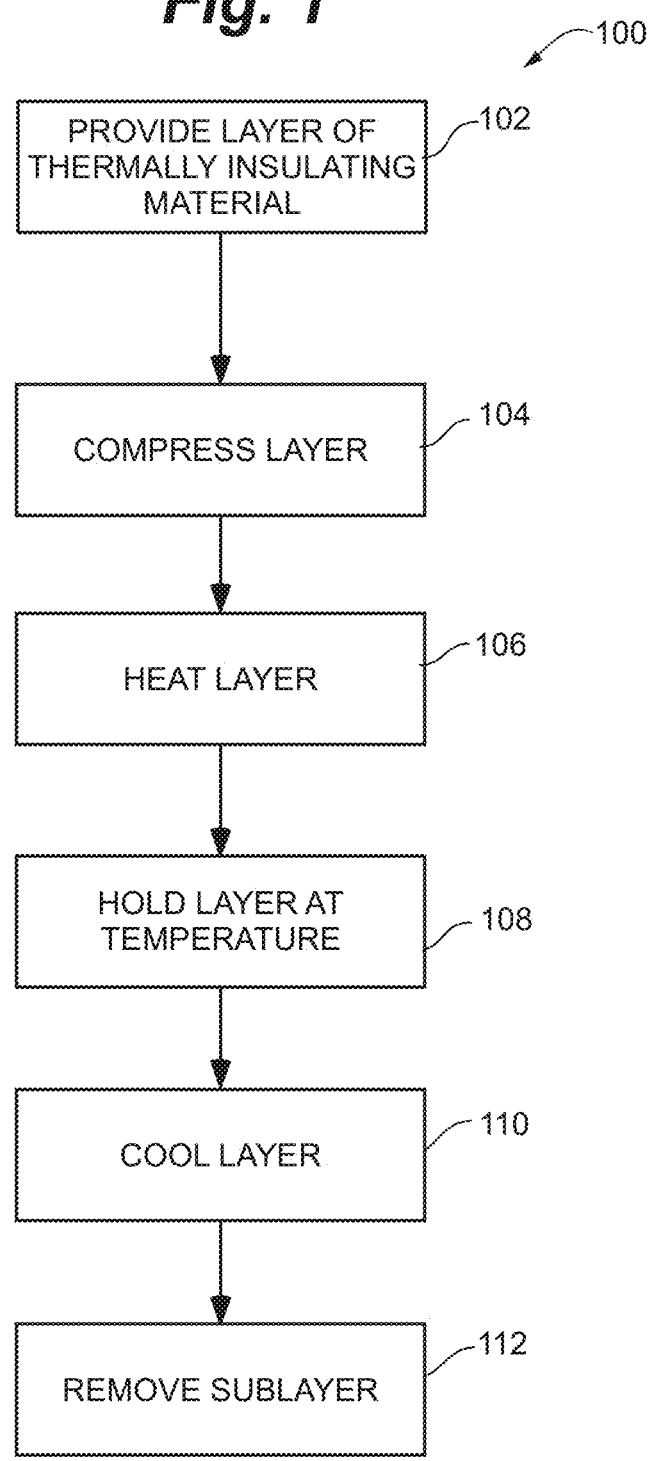

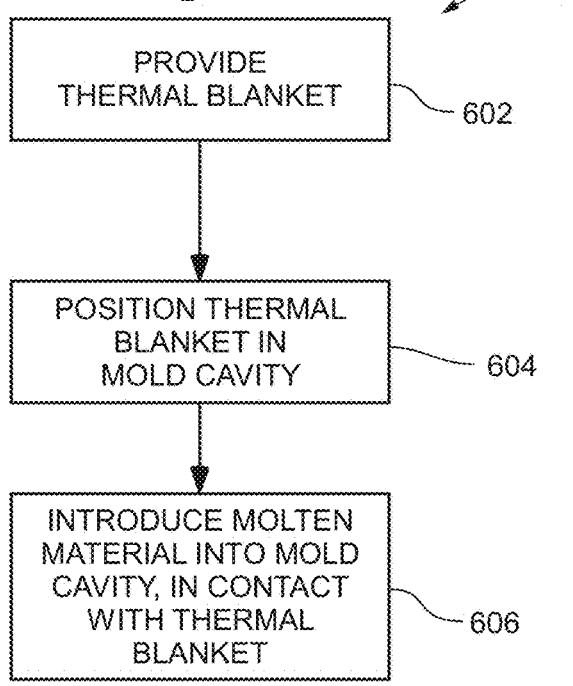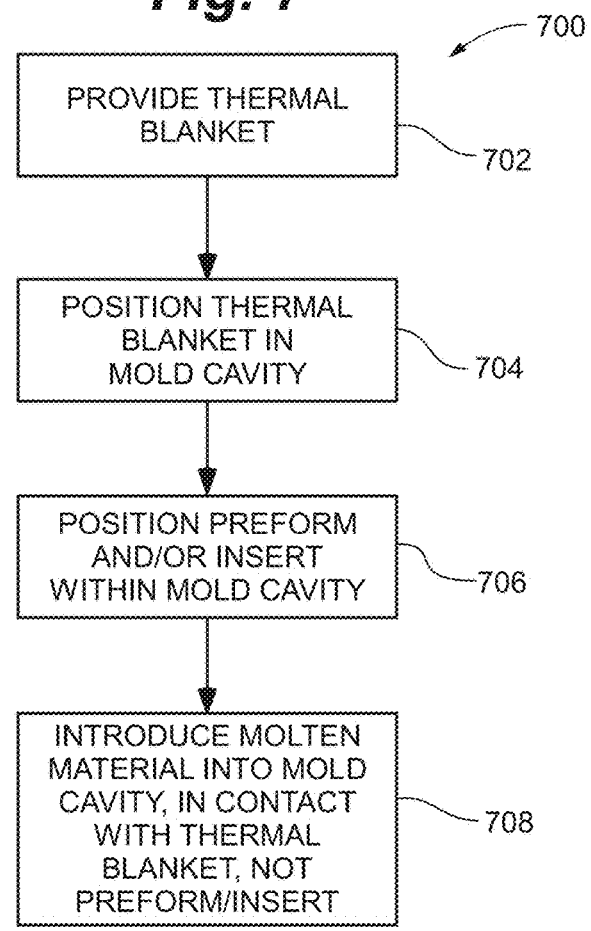

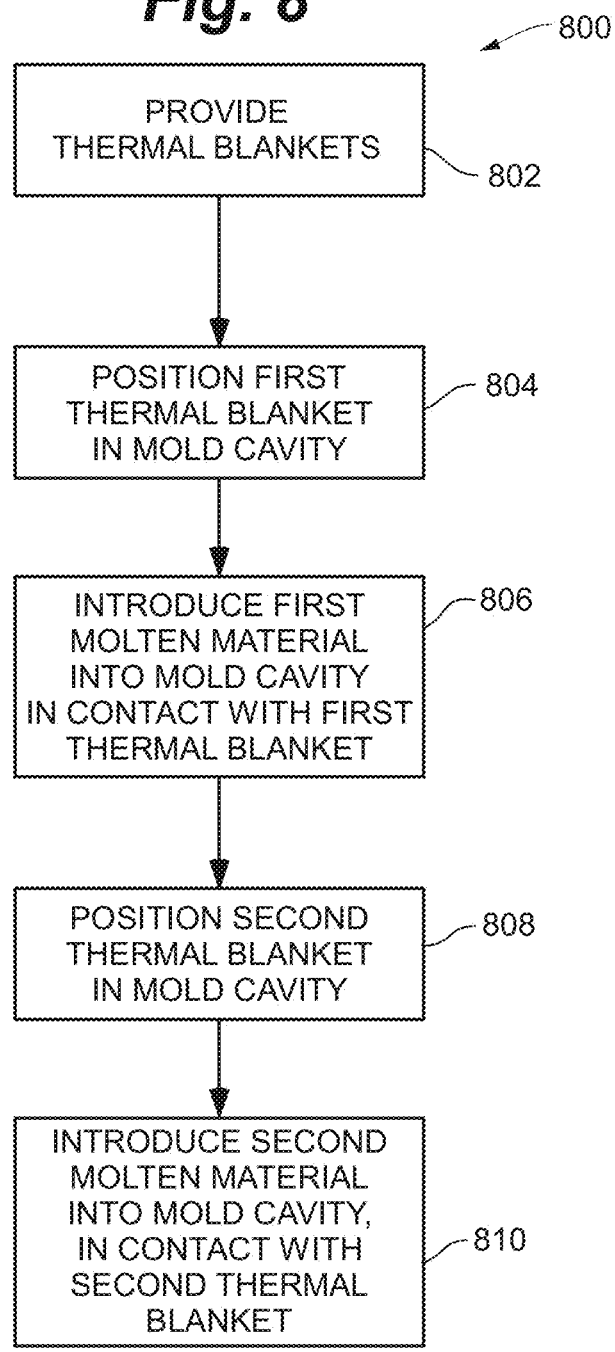

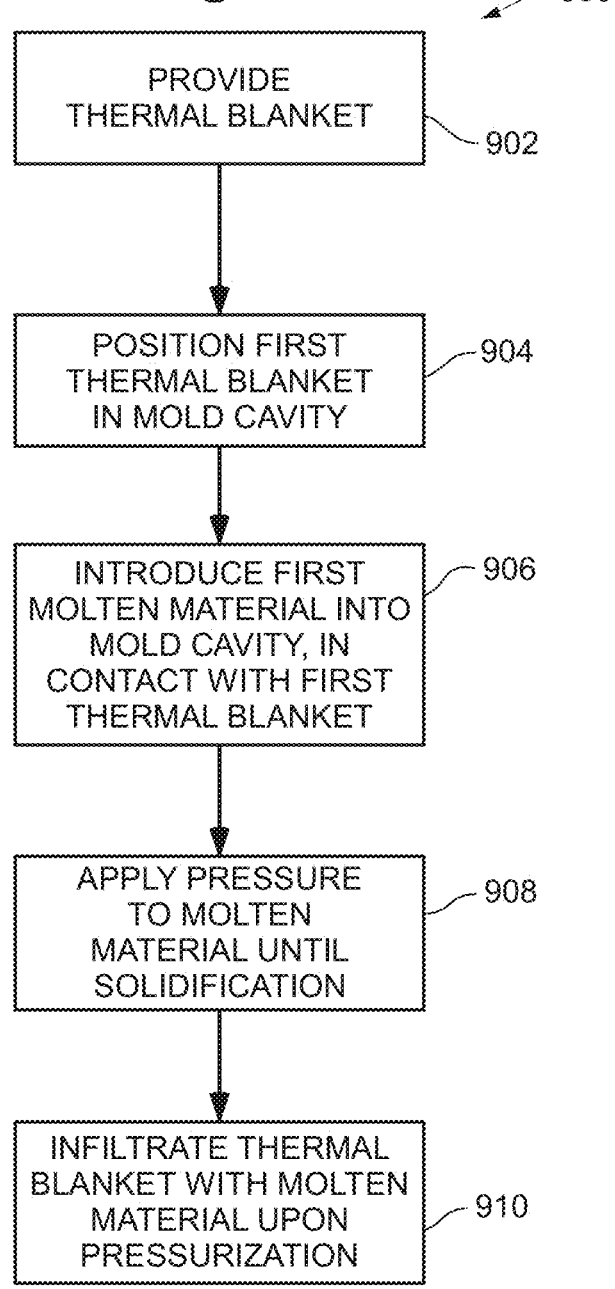

THERMAL ISOLATION FOR CASTING ARTICLES

CROSS-REFERENCES

This application is a continuation of U.S. patent application Ser. No. 13/840,423, filed Mar. 15, 2013, which claims priority to U.S. provisional patent application No. 61/623,532, filed Apr. 12, 2012, entitled Thermal Isolation for Casting Articles, and to U.S. provisional patent application No. 61/690,727, filed Jul. 3, 2012, entitled MMC with Enhanced Thermal Isolation, and is related to U.S. patent application Ser. No. 13/836,001, entitled Thermal Isolation Spray for Casting Articles. Each of the above-referenced applications are hereby incorporated by reference herein in their entirety.

BACKGROUND

Casting is an old and well-known art in which liquefied or molten materials are poured or injected into a mold which has a cavity of a desired shape. The liquefied materials are then allowed to solidify to create a cast article. Metal casting is one type of casting in which molten metals are introduced into a mold cavity at high temperatures and then allowed to solidify as the metals cool. The rate and pattern of cooling can affect the solidification process and can directly affect the structure of the final cast article. For example, in some cases portions of a casting may begin to solidify at many different locations, leading to multidirectional solidification patterns within the casting. In other cases, premature cooling or cooling at undesired rates can result in undesirable microstructures within the casting or may clog or otherwise block portions of a mold cavity resulting in an unfinished or partial casting.

Solidification of a molten material within a mold cavity most frequently begins when the molten material first contacts the side walls or other inner surfaces of the mold cavity. Because molten materials are usually much hotter than the mold itself, heat quickly escapes from the molten material into the mold upon first contact. Once the material first contacts the mold wall, solidification can spread rapidly through the molten material throughout the cavity. For example, molten metals exhibit an extremely high rate of heat loss and once solidification begins, an entire amount of molten metal within a mold can freeze almost instantaneously. The period of time extending from the first introduction of the molten material until complete solidification is often referred to as the dwell time. As will be appreciated, dwell times can be extremely short for molten materials, especially for molten metals, and sometimes may only last for a few seconds or even less than a second (e.g., milliseconds).

In some cases, it can be helpful to extend the dwell time of a molten material. For example, lengthening the dwell time may ensure adequate time for filling a mold cavity before solidification is complete or may promote the growth of desirable grain patterns in the solidifying material. In addition, a longer dwell time may facilitate additional activities during the casting process. As an example, when casting composite materials, extending the dwell time can allow more flexibility in positioning inserts, preforms, and other composite materials within the casting before solidification is complete.

Past efforts to extend dwell time include a few different approaches. Some have tried to increase dwell time by minimizing the temperature difference between surfaces of the mold cavity and the molten material being introduced into the mold. Some efforts included heating the mold to a temperature closer to that of the molten material. Other efforts included lowering the temperature of the molten material to a temperature closer to that of the mold. Other efforts include using complex gating systems to distribute the molten material more quickly throughout a mold. While these efforts have been somewhat helpful, they have not been practical because increasing the temperature of the mold can consume large amounts of energy and may be inherently limited by the melting point of the mold material. Advanced gating systems can increase the complexity and cost of casting with little added benefit.

SUMMARY

Some embodiments of the invention are directed to methods for casting articles that include the positioning of a thermal blanket in a mold cavity before or during the casting process. In one embodiment, a method for casting an article is provided that includes providing a thermal blanket and positioning at least a portion of the thermal blanket within a mold cavity. The thermal blanket includes a layer of thermally insulating material that has a first surface and a second surface. The method further includes introducing a molten material into the mold cavity and into contact with the first surface of the thermal blanket until the molten material fills the mold cavity. In some cases, the molten material within the mold cavity remains in a molten state during a dwell time that extends from the introducing of the molten material into the mold cavity at least until the molten material fills the mold cavity.

In another embodiment, a method for casting an article is provided that includes providing a thermal blanket, positioning at least a portion of the thermal blanket within a mold cavity, introducing a molten material into the mold cavity and into contact with the first surface of the thermal blanket, and applying pressure to the molten material until the molten material solidifies to form at least a portion of a cast article. The molten material within the mold cavity remains in a molten state during a dwell time extending from the introducing of the molten material into the mold cavity to the applying of pressure to the molten material.

Other embodiments of the invention provide systems for casting an article. In one embodiment, a system for casting an article is provided that includes a mold cavity and at least one thermal blanket. The mold cavity has an inner surface and the thermal blanket includes a layer of thermally insulating material. In some cases the thermal blanket is configured to isolate a molten material introduced into the mold cavity from the inner surface of the mold cavity. Doing so can allow the molten material within the mold cavity to remain in a molten state at least until the molten material fills the mold cavity.

Other embodiments of the invention provide thermal blankets for use in casting an article. In one embodiment, a thermal blanket is provided that includes a layer of thermally insulating material that has a first surface, a second opposing surface, and one or more sublayers of a ceramic fiber material. Each sublayer includes an arrangement of ceramic fibers substantially positioned in an X-Y orientation parallel to the first surface of the layer. The ceramic fibers are at least partially sintered together. In some cases, the layer of thermally insulating material has a thickness of less than about 0.0625 inches.

Other embodiments of the invention provide methods for making a thermal blanket for use in casting an article. In one embodiment, a method is provided that includes providing a layer of thermally insulating material and compressing the layer of thermally insulating material to a density of between about 6 lbs/ft$^3$ and about 12 lbs/ft$^3$. The layer of insulating material includes a ceramic fiber material that is formed in a plurality of sublayers of ceramic fibers. The method further includes heating the layer of thermally insulating material so as to at least partially sinter together the ceramic fibers within each of the plurality of sublayers. Some time after heating, the method includes removing one or more of the plurality of sublayers of ceramic fibers. The one or more of the plurality of sublayers can define a thermal blanket for use in casting an article.

These and various other features and advantages will be apparent from a reading of the following detailed description.

BRIEF DESCRIPTION OF THE DRAWINGS

The following drawings illustrate particular embodiments of the present invention and therefore do not limit the scope of the invention. The drawings are not to scale (unless so stated) and are intended for use in conjunction with the explanations in the following detailed description. Embodiments of the present invention will hereinafter be described in conjunction with the appended drawings, wherein like numerals denote like elements.

FIG. 1 is a flow diagram illustrating a method of manufacturing a thermal blanket according to an embodiment.

FIG. 6 is a flow diagram illustrating a method for casting an article according to an embodiment.

FIG. 7 is a flow diagram illustrating a method for casting an article according to an embodiment.

FIG. 8 is a flow diagram illustrating a method for casting an article according to an embodiment.

FIG. 9 is a flow diagram illustrating a method for casting an article according to an embodiment.

DETAILED DESCRIPTION

Figure 2A:
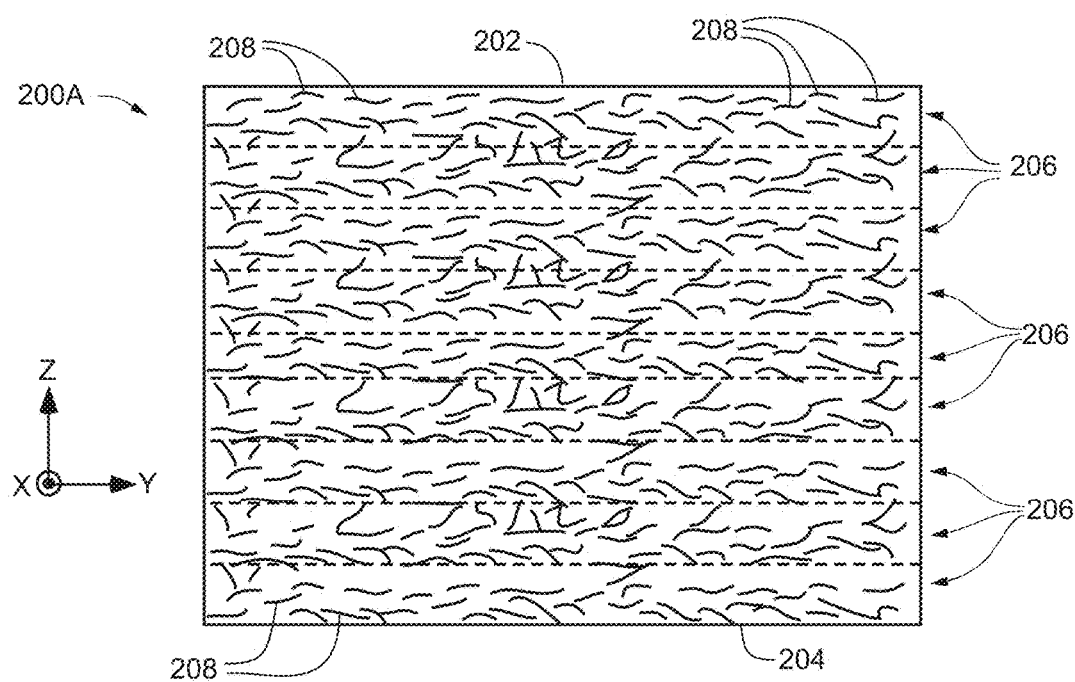
FIG. 2A is a schematic, side sectional view of a layer of thermally insulating material before compression according to an embodiment.

The following detailed description is exemplary in nature and is not intended to limit the scope, applicability, or configuration of the invention in any way. Rather, the following description provides some practical illustrations for implementing exemplary embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Embodiments described herein are generally related and applicable to casting processes, including metal casting. Many examples described herein are related to or in various ways address heat transfer from the molten material that is introduced into a mold cavity. For example, some embodiments discuss heat transfer from molten materials into the surrounding mold cavity walls, shot sleeves, shot tips, and/or other parts of different kinds of molds. Also, some embodiments discuss heat transfer from molten material into various preforms and/or inserts within a composite casting. Some embodiments are directed to changing heat transfer properties through the use of insulating materials.

In addition, some embodiments are directed to controlling and/or changing the behavior of molten materials as they approach surfaces within the mold cavity such as the surfaces of inserts, preforms, and other objects within the mold cavity as well as the inner walls of the mold cavity itself. Also, some embodiments discuss materials that may be used to affect heat transfer within the casting process, and some embodiments describe thermally insulating materials that can be useful for casting processes. Some embodiments describe methods for making or manufacturing thermally insulating materials that can be used to address heat transfer in a casting process. Some embodiments describe methods for using some types of insulating materials within different casting processes, as well as systems that are provided to practice the methods. Of course, it should be appreciated that the embodiments described herein are examples of different products, articles, systems, and/or methods, and are not meant to limit the scope of possible embodiments or their application.

FIG. 1 is a flow diagram illustrating a method 100 of manufacturing a thermal blanket according to an embodiment. The method 100 generally starts by providing 102 a layer of thermally insulating material. The layer of thermally insulating material is then compressed 104, heated 106, and held 108 at a desired temperature for a predetermined period of time. After holding the layer of material at the desired temperature for the predetermined time period, the layer of material is allowed to cool 110 to facilitate handling. A next step in the method 100 includes removing 112 one or more sublayers from the layer of thermally insulating material as will be described further herein.

According to some embodiments, the layer of thermally insulating material used at the start of the method 100 exhibits insulative properties that can be useful for reducing heat transfer from a molten material within a mold cavity. Accordingly, the thermally insulating material can be any desired material that has a desired heat transfer property.

In some embodiments, the thermally insulating material includes a ceramic material. In certain embodiments, the thermally insulating material includes a ceramic fiber material. The configuration of the thermally insulating material can vary. However, in some cases, the thermally insulating material is configured as a mat or blanket of ceramic fibers. One example of a ceramic fiber material is a layer of material that includes aluminum oxide and/or silica fibers.

FIG. 2A is a schematic, side sectional view of one example of a layer 200A of thermal insulating material as it may appear before being compressed 104 according to the method 100. It should be appreciated that FIG. 2A is a simple, high-level schematic view of a possible layer 200A and is not to scale or representative of all details within such a layer. According to some embodiments, the layer 200A of thermally insulating material includes a first surface 202, a second opposing surface 204, and one or more sublayers 206 of a ceramic fiber material. According to some embodiments, each sublayer 206 is formed from an arrangement of flexible ceramic fibers 208 that are substantially (e.g., mostly or generally) positioned in an X-Y orientation generally parallel to the first surface 202 as shown in the example in FIG. 2A. In some cases, the character of the multiple small ceramic fibers provides the layer 200A with a measure of resilience or compressibility. It should be appreciated that while dotted lines are used in FIG. 2A to illustrate representative sublayers 206, the sublayers may not actually have a uniform thickness or completely parallel configuration as shown in the simplified drawing in FIG. 2A.

It is contemplated that a number of different types of insulative material can be used to form the layer of thermally insulating material. According to some embodiments, a layer of thermally insulating material can be a layer of the material SAFFIL® LD Mat, which is a well-known thermal ceramics material. Another commercially available material that may be useful in some embodiments is Kaowool, which is a ceramic blanket insulation manufactured by Thermal Ceramics.

Returning to FIG. 1, after providing 102 the layer of thermally insulating material, the method 100 includes compressing 104 the layer of material and heating 106 the layer of material. According to some embodiments, the layer of thermally insulating material is compressed while it is heated, and remains compressed while the layer is held 108 at a desired temperature for a period of time. According to some embodiments, the layer of thermally insulating material may be compressed 104 and heated 106 in a kiln. For example, in some cases, the layer of material can be laid flat on a surface in a kiln and compressed with one or more free-standing weights or weighted articles (e.g., kiln furniture). In some cases, compressing the layer of material by gravity with weights can be useful when it is desirable to heat the material to a degree that is not normally feasible for clamping molds (e.g., steel molds with a clamping mechanism).

According to some embodiments, the force used to compress the layer of thermally insulating material is determined based on the hold time, the temperature, and the desired density in the compressed layer. According to some embodiments, enough weight is placed on the layer of material to create a force that compresses the layer of thermally insulating material to a density of between about 6 lbs/ft$^3$ and about 12 lbs/ft$^3$ after the end of the holding period. In some cases, the force is sufficient to compress the layer to a density of about 9 lbs/ft$^3$. In some cases, the force of the weights and the temperature of the kiln (or other heating device) causes a phase change in the layer of thermally insulating material over the course of the hold period. For example, in some cases, the method 100 may include heating 106 the layer of material to, and holding 108 it at, a temperature so as to at least partially sinter together some or many of the ceramic fibers within a number of sublayers within the layer of material.

The holding period during which the layer is compressed and heated may vary depending upon the pressure and temperature imparted to the layer of material. According to one embodiment, a layer of thermally insulating ceramic fiber material (e.g., SAFFIL® LD mat) is heated to about 1,200° C. (2192° F.), and then held under pressure for at least a minimum of one hour at 1,200° C. (2192° F.). In some cases, the ceramic fiber material is brought to about 1,200° C. (2192° F.) and then held for between about 4 hours and about 8 hours. In another embodiment, the ceramic fiber material is held at about 1,200° C. (2192° F.) for about 6 hours. Of course, a variety of holding periods will work to effect the desired phase change in the material depending upon the desired change and other conditions of pressure and temperature. In some embodiments, the holding temperature can be from about 1,093° C. (2000° F.) to about 1,260° C. (2300° F.); in some embodiments, the holding temperature can be from about 1,149° C. (2100° F.) to about 1,204° C. (2200° F.). In some cases, a layer of ceramic fiber material such as SAFFIL® LD mat may be compressed and held at about 1,200° C. (2192° F.) for more than about 4 hours, more than about 6 hours, more than about 8 hours, or an even greater number of hours. For example, in some cases, a minimum amount of holding time may be needed to effect the desired phase change in the thermally insulating material, but after the minimum threshold time has been met, additional holding time may not adversely affect the material.

Returning to FIG. 1, after holding 108 the layer of thermally insulating material at the desired temperature and compressing for the desired period of time, the now-compressed layer is optionally allowed to cool 110 sufficiently to enable handling of the material. In some cases, the now-compressed layer may be allowed to cool completely to room temperature (e.g., about 20° C. (68° F.)). After cooling a sufficient amount, the method 100 includes removing 112 one or more sublayers of ceramic fibers from the compressed layer of thermally insulating material. While the embodiment in FIG. 1 illustrates a cooling step, it should be appreciated that in some cases a cooling step may not be necessary and one or more sublayers may be removed without the need for cooling.

Figure 2B:
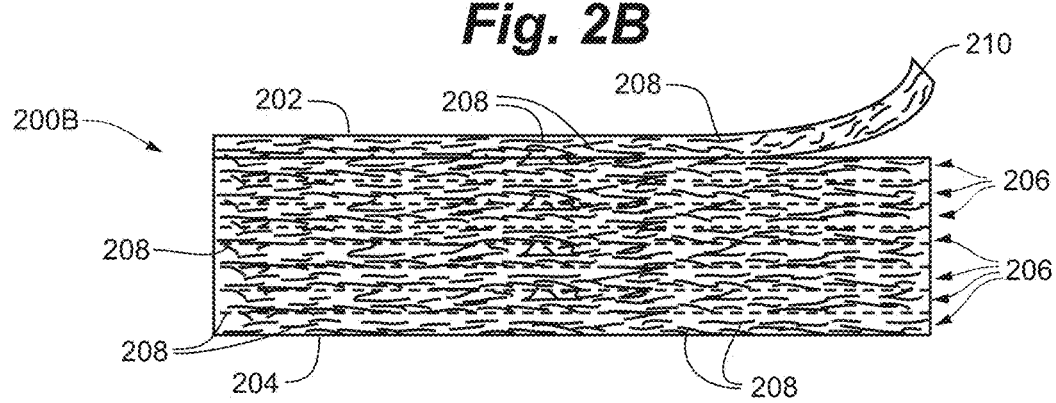
FIG. 2B is a schematic, side sectional view of a layer of thermally insulating material after compression according to an embodiment.

FIG. 2B is a schematic, side sectional view of the layer 200B of thermally insulating material shown in FIG. 2A after compression according to some embodiments. As with FIG. 2A, it should be appreciated that FIG. 2B is not necessarily to scale and is instead a simplified, high-level schematic view of how the layer 200A may change as a result of the compressing 104, heating 106, and holding 108 processes in the method 100. In addition, while dotted lines are used in FIG. 2B to illustrate separate sublayers 206, it should be appreciated that the sublayers may not have a uniform thickness or completely parallel configuration as shown in the simplified drawing in FIG. 2B.

As illustrated by the example in FIG. 2B, in some cases, compressing and heating the layer 200A of thermally insulating material deforms the ceramic fiber sublayers 206 such that the layer 200B of material maintains a compressed configuration after compressing and heating. In some cases, this deformation or phase change may result from adjacent fibers within sublayers sintering together, thus providing a binderless method of holding the fibers within each sublayer together. In some cases, some ceramic fibers may generally extend in the Z direction between sublayers, but Applicant believes that for the most part the sintering occurs in the X-Y direction, thus facilitating the separation and removal of one or more of the sublayers after the layer 200B has been compressed and heated. For example, in some cases, one sublayer 210 may be peeled off of the stack of sublayers 206 as shown in FIG. 2B.

After removing 112 one or more sublayers 206 from the compressed layer 200B of thermally insulating material, the one or more removed sublayers 206 can form the basis of an insulating thermal blanket that can be used in various casting methods and systems as will be further described herein. According to some embodiments, the number of sublayers 206 removed from the layer 200B to form a thermal blanket may vary depending upon the structural properties and thermal characteristics desired for a particular application. As used herein, the term sublayer is used to refer to one or more of the layers separated from the thermally insulating starting material (e.g., a ceramic fiber material such as SAFFIL® LD mat or Kaowool). In some cases, a thermal blanket is described herein as having or comprising a layer of thermally insulating material, which is used is some cases to refer to the sublayer(s) removed from the compressed thermally insulating material.

In some cases, the thickness of the removed sublayers 210 (or alternatively, a layer of material that is a part of a thermal blanket) may be selected to exhibit sufficient strength for contacting a molten material but still meet certain maximum thickness preferences in order to exhibit certain desired characteristics. For example, in some cases, the one or more sublayers 210 removed have a total thickness of less than about 0.0625 inches but have a density of between about 6 lbs/ft$^3$ and about 12 lbs/ft$^3$. In some cases, the removed sublayers 210 may have a density of about 9 lbs/ft$^3$. According to some embodiments, the removed sublayers (forming a layer of the thermal blanket) have a thickness of between about 0.0001 inches and about 0.0625 inches. In some cases, the thickness is chosen to be between about 0.03 inches and about 0.06 inches. According to some embodiments, the thickness of the removed sublayer(s) 210 (e.g., a layer of thermal blanket) is about 0.03 inches.

According to some embodiments, depending upon the materials being used, the compressing the material to achieve a density greater than 12 lbs/ft$^3$ can start breaking fibers within the thermal blanket into particles. In some cases, a pressure leading to a density slightly higher than 12 lbs./ft$^3$ may be used, although using a weight that leads to a much lesser density may not produce the desired sublayering described above and it may be more difficult to peel or otherwise remove layers of the sheets.

According to some embodiments, the layers within a thermal blanket (e.g., the removed sublayer(s) 210) exhibit certain properties and/or characteristics that are useful in a casting process. For example, in some cases, a thermal blanket is configured to isolate a molten material introduced into the mold cavity from an inner surface of the mold cavity. In some cases, the isolation lasts long enough so that the molten material within the mold cavity remains in a molten state at least until the molten material fills the mold cavity. In some cases, the thermal blanket or sublayers are configured to isolate molten material from an inner surface of a mold cavity until pressure is applied to the molten material (e.g., through squeeze casting).

In some cases the phrase "remaining in a molten state" means that the molten material remains completely (i.e., 100%) molten for a period of time. In some cases the phrase "remaining in a molten state" means that the molten material is substantially all molten or mostly molten, or mostly molten partially solidified. In some cases the phrase "remaining in a molten state" means that the material remains at a temperature above the liquidus temperature curve on a phase diagram for that material, such that the material is considered sufficiently molten for practical purposes.

According to some embodiments, the thermal blanket is configured to break apart and/or substantially disintegrate when pressure is applied to molten material within a mold cavity. For example, in some cases, the thermal blanket or sublayers may be sufficiently strong to withstand the weight of a molten material, but may start to break apart once pressure is applied to the molten material and the material is pushed into and starts to infiltrate the thermal blanket. Upon infiltrating the thermal blanket, less insulation is between the molten material and other surfaces within the mold cavity, which tends to speed up heat transfer and solidification. In some cases, a thermal blanket comprising a layer of thermally insulating material (i.e., one or more sublayers removed from a compressed material as described with respect to FIGS. 1-2B) may break apart and substantially disintegrate such that upon removing a casting from a mold, the insulating material from the thermal blanket is virtually undetectable. For example, the ceramic fibers within a sublayer of compressed SAFFIL® LD mat that make up one example of a thermal blanket may not be visible to the naked eye and may in some cases only be detectable with the aid of instrumentation, such as a scanning electron microscope.

According to some embodiments, a thermal blanket includes a layer of thermally insulating material having a first surface and an opposing second surface. As described above, in some cases, the layer of thermally insulating material in the thermal blanket may be formed by removing one or more sublayers of a compressed and densified insulating material. According to some embodiments, the thermal blanket consists of the layer of thermally insulating material, i.e., the thermal blanket and the group of removed sublayer(s) are one and the same. In some cases, the thermal blanket may consist essentially of removed sublayers from a compressed insulating material as shown in FIG. 2B, but may also include other materials to the extent they do not substantially affect the performance of the removed sublayers. As just one example, in some cases, a thermal blanket may include certain other materials, but upon disintegration, the other materials are virtually undetectable in a similar manner to the insulating materials. Of course some thermal blankets may include other materials that may enhance or otherwise affect the performance of the thermal blanket and embodiments are not limited to a particular configuration.

As mentioned above, some embodiments such as those described with respect to FIGS. 1-2B are generally related to thermal blanket insulators and methods for making them. Turning now to FIGS. 3-18, a number of embodiments relating to methods and systems for using thermal blankets, and the articles cast with them, are described. In addition, U.S. patent application Ser. No. 13/836,001, filed concurrently herewith, entitled Thermal Isolation Spray for Casting Articles, describes a number of embodiments relating to casting with thermal insulator sprays, and the articles cast with them. Some or all of the embodiments applicable to thermal insulator sprays in the related application may also be applicable to thermal blanket insulators. This related application is incorporated herein by reference in its entirety.

Figure 3:
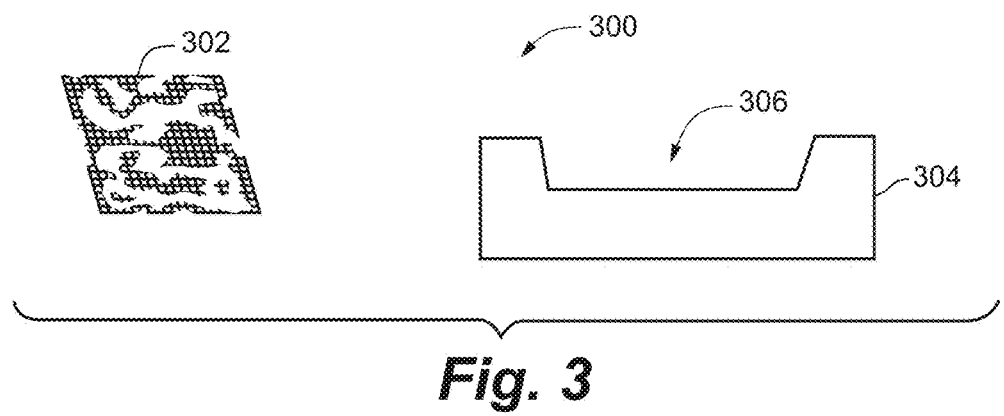
FIG. 3 is a schematic representation of a casting system according to an embodiment.

FIG. 3 is a schematic representation of a casting system 300 according to an embodiment. The system 300 generally includes a thermal blanket 302 and a mold 304 defining a mold cavity 306. According to some embodiments, a method for casting an article includes positioning the thermal blanket 302 within the mold cavity 306. The thermal blanket 300 includes a layer of thermally insulating material having a first surface and a second surface. In some cases, the thermal blanket 302 may be one of the thermal blankets described above with respect to FIGS. 1-2B, or a thermal blanket incorporating one or more sublayers of a compressed insulating material as described above. The mold 304 can be a number of different types of molds and may be configured for different types of casting. In some cases, the mold 304 may be useful for gravity casting.

Figure 4:
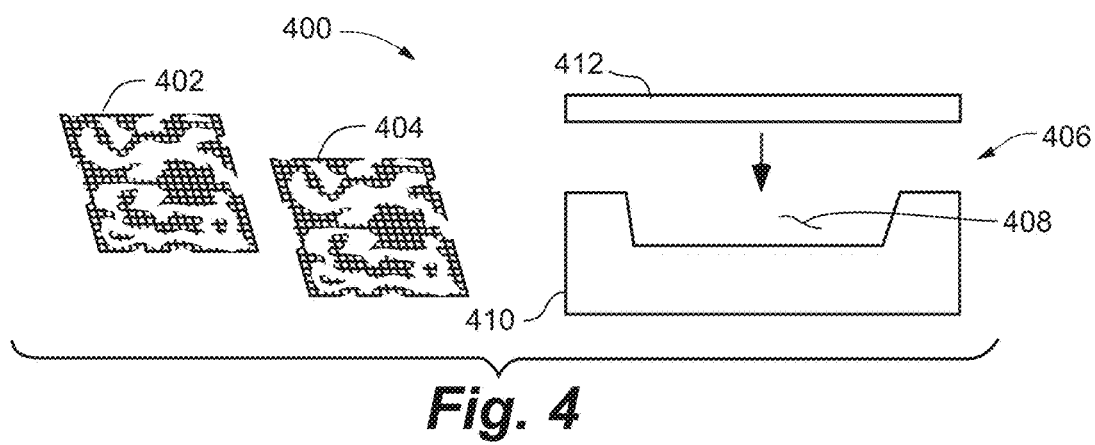
FIG. 4 is a schematic representation of a casting system according to an embodiment.

FIG. 4 is a schematic representation of a casting system 400 according to an embodiment. The system 400 generally includes a first thermal blanket 402 and a second thermal blanket 404 and a mold 406 defining a mold cavity 408. According to some embodiments, a method for casting an article includes positioning the first and second thermal blankets 402, 404 within the mold cavity 408. The thermal blankets 400 each include a layer of thermally insulating material having a first surface and a second surface. In some cases, the thermal blankets 402, 404 may be one of the thermal blankets described above with respect to FIGS. 1-2B, or a thermal blanket incorporating one or more sublayers of a compressed insulating material as described above. The mold 406 can be a number of different types of molds and may be configured for different types of casting. In some cases, the mold 406 comprises a first mold portion 410 and a second mold portion 412 that may be pressed together for during a method of direct squeeze casting.

Figure 5:
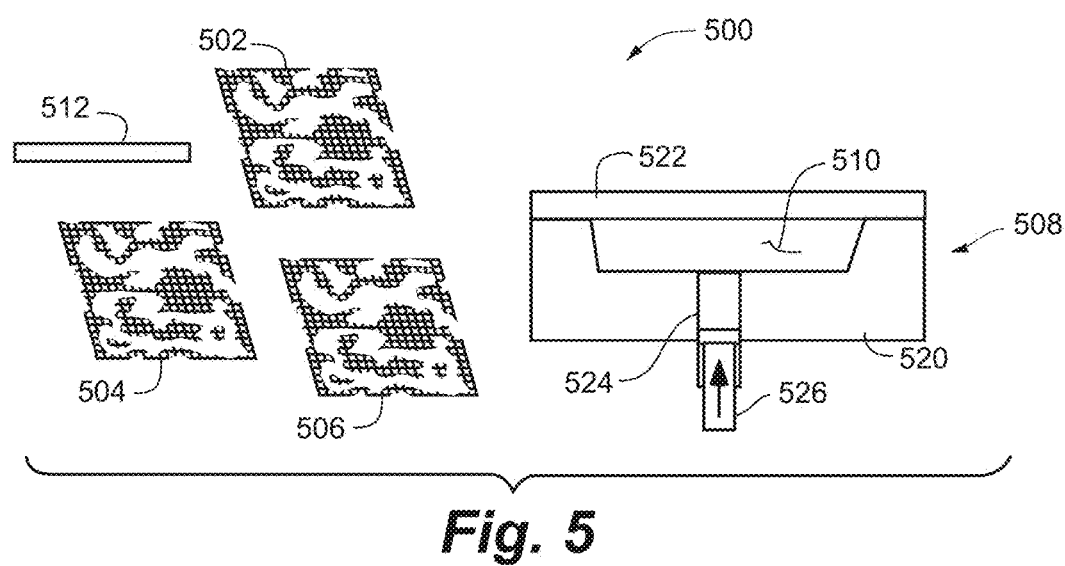
FIG. 5 is a schematic representation of a casting system according to an embodiment.

FIG. 5 is a schematic representation of a casting system 500 according to an embodiment. The system 500 generally includes three thermal blankets 502, 504, and 506, and a mold 508 defining a mold cavity 510. In addition, the system 500 includes a preform or insert 512. According to some embodiments, a method for casting an article includes positioning the thermal blankets 502, 504, and 506 within the mold cavity 510 along with the preform or insert 512. The thermal blankets each include a layer of thermally insulating material having a first surface and a second surface. In some cases, the thermal blankets may be one of the thermal blankets described above with respect to FIGS. 1-2B, or a thermal blanket incorporating one or more sublayers of a compressed insulating material as described above. The mold 508 can be a number of different types of molds and may be configured for different types of casting. In some cases, the mold 508 includes a first mold portion 520, a second mold portion 522, a shot sleeve 524, and a plunger 526 that may be actuated to inject molten material into the mold cavity 510 during a method of indirect squeeze casting.

While FIGS. 3-5 illustrate a few examples of possible systems that may be used for casting articles according to embodiments described herein, it should be appreciated that the illustrations are just examples and are not meant to limit other configurations for systems in other embodiments. As just one example, some systems may include a mold, a plurality of thermal blankets and a plurality of preforms and/or inserts that are used to cast a composite article.

Some methods for casting articles may include the use of one or more thermal blanket such as one of those described above. According to some embodiments, a thermal blanket may be used to help insulate a shot sleeve and/or shot tip that is part of an indirect squeeze casting mold. As is known, molten materials injected into a mold through a shot sleeve and shot tip can in some cases begin to freeze or solidify while in the shot sleeve/tip before the materials even reach the mold cavity. In some cases, premature freezing can cause the molten material to build up on the interior surface of the shot sleeve and/or tip, and in some cases may lead to partial or complete blocking of the passageway for introducing the molten materials into the mold cavity. In some cases, this difficulty is particularly pronounced when dealing with small shot tips. According to some embodiments, a thermal blanket may be positioned within the shot sleeve and/or shot tip in order to isolate those portions of the mold mechanism from the molten materials. For example, as the molten material is pressed through the shot sleeve, into the tip and into the mold cavity, it may pass by and contact the thermal blanket, but in some cases will not penetrate or infiltrate the thermal blanket to any significant extent, leaving the material free to flow through the tip into the mold cavity. In addition, in some cases a thermal blanket be able to isolate some parts of the mold from the molten material that would in some cases be difficult with other types of insulation. For example, some thermal blankets and/or the insulating layers within the thermal blanket may have a total thickness of less than about 0.0625 inches.

According to some embodiments, the removed sublayers (forming a layer of the thermal blanket) have a thickness of between about 0.0001 inches and about 0.0625 inches. In some cases, the thickness is chosen to be between about 0.03 inches and about 0.06 inches. According to some embodiments, the thickness of the removed sublayer(s) 210 (e.g., a layer of thermal blanket) is about 0.03 inches. Accordingly, very thin thermal blankets can be used within a narrow or constricted area due to their small thicknesses.

According to some embodiments, a method for casting an article includes using at least two thermal blankets to control a direction of solidification within the casting. For example, in some cases, a first thermal blanket may be positioned within a mold cavity against the mold cavity surface. Next, an amount of molten material can be introduced into the mold cavity. After introducing the molten material, a second thermal blanket may be positioned on top of the molten material. In some cases, one of the first and second thermal blankets is thinner than the other, which may provide control of the direction of solidification. For instance, in some cases, the thinner layer of thermal blanket may begin to wear down and break away before a thicker layer. In some cases, a thinner layer of thermal blanket provides less insulation that a thicker layer, and thus heat is transferred more readily through the thinner layer, leading to the start of solidification at the thinner layer. Solidification can progress through the molten material until it reaches the thicker thermal blanket layer.

According to some embodiments, a thermal blanket may be used to create a functional gradient within a casting. As is known, some types of molten materials include one or more molten metals and in some cases may include a particulate material or ceramic fiber material mixed in with the metals. According to some cases, a thermal blanket may be positioned within the mold such that as the molten material infiltrates and passes through the thermal blanket, the particular/fiber matter within the molten materials tends to have difficulty passing through the thermal blanket. Accordingly, a layer or amount of the particulates and/or fibers tends to build up at the interface of the thermal blanket. One example of a molten material that includes a fractional amount of particulates and/or fibers is Duralcan, which is manufactured by Rio Tinto Alcan. For example, in one possible use, the Duralcan material may be 30 vol. fraction as the material is introduced into the mold cavity and may be up to about 60 vol. fraction at the interface of the thermal blanket due to the difficulty in passing the particulate matter through the thermal blanket. In some cases, the molten material may then tailor back down to about 30 vol. fraction as it nears another side of the mold cavity, thus creating a functional gradient within the molten material. Of course this is just one example of a possible functional gradient and it should be appreciated that numerous variations can be practiced based on Applicant's disclosure herein.

According to some embodiments, one or more thermal blankets may be positioned within a mold cavity in order to provide some measure of control over how, where, and/or when the molten material within the mold cavity meets the mold surfaces after introduction. As discussed elsewhere, molten materials such as metals can in some cases solidify very quickly upon contacting the mold walls due to rapid heat exchange. In some embodiments, one or more thermal blankets can be positioned within the mold cavity in order to prevent the molten materials from contacting the mold walls until pressure is applied to the molten materials. For example, as molten material is introduced into a mold cavity it may disperse through the cavity and eventually contact one or more portions of one or more thermal blankets. As the amount of material continues to increase, it may in some cases form a surface tension skin in contact with the thermal blanket(s), thus preventing it from passing through the thermal layers to the mold cavity walls. In other words, the thermal blanket(s) isolate the molten material from one or more portions of a mold cavity wall as the cavity is being filled. In some cases, once the cavity is filled, additional molten material may be injected into the mold, thus applying pressure on the material already filling the mold cavity. In some cases, a cavity may be filled and pressure may be applied by closing a mold, e.g., by bring together multiple mold portions, clamping down a top mold plate, etc. Accordingly, some embodiments can control (e.g., prolong or delay) the moment when the molten material contacts a mold wall until pressure is applied. In some cases, once the desired pressure is achieved, the molten materials will break through the surface tension at the interface with the thermal blanket(s) and begin infiltrating the thermal blankets. As infiltration progresses, the molten materials lose greater amounts of heat to the surrounding environment and may begin to partially solidify while moving, thus breaking up the fibers and/or particulate structures in some thermal blankets.

In some cases, upon achieving the desired pressure within the mold cavity, the molten materials may contact the mold surface very quickly in what may seem an instantaneous manner. As just one example, in some cases achieving the desired pressure causes the molten materials to break into and infiltrate a thermal blanket that is about 0.25 inches thick, and then completely solidify in about 200 ms. Accordingly, in some cases a thermal blanket can be useful for isolating or separating molten materials from other structures in the mold such as the mold cavity walls due to e.g., the surface tension of the molten materials pressing against the blanket. In some cases once pressure is applied, reinforcing fibers within a thermal blanket (e.g., within a ceramic fiber material) may easily give way to the increased force coming from the molten materials. As the molten materials infiltrate and begin to solidify, the movement of the solidifying material tends to break up the ceramic fiber material in some blankets into microscopic pieces. Such pieces may not be visible to the human eye, but may require a scanning electron microscope to detect.

Certain embodiments described herein describe positioning one or more thermal blankets within a mold cavity. In some cases, the positioning may be as simple as loosely laying the blanket into the mold. Accordingly, the blanket may be used to create a sort of holding pond to isolate the molten material from the sides of a mold cavity during a pour, so that almost all of the material necessary makes it into the mold cavity before solidifying. Upon introducing a sufficient amount of molten material into the "holding pond," pressure may be applied to force the molten material through the thermal blanket to the surface of the cavity. Accordingly, a thermal blanket may be useful in some cases to allow the molten metal to come into nearly all or all of the surfaces of a mold cavity nearly instantaneously. Simultaneous or near simultaneous freezing along all surfaces of the mold may in some cases promote a more desirable solidification patters within the final casting.

In some cases, the thermal blanket may generally follow the major contours of a mold cavity (e.g., transitions between major surfaces, etc.), but in some cases, may not closely follow minor contours in the surface. For example, in some cases, a mold may define several smaller voids, crevices, recesses, runs, etc., that form surface features when cast along with the main body of the casting. In some cases, a thermal blanket may be laid on top of such surface features, but may not be inserted into small recesses or exactly follow all the minor details within a mold. In some cases, it is believed that some portions of a mold cavity surface may be left "uncovered" because use of the thermal blanket may generally allow most or all of the cavity to be filled, and then upon pressurization, all smaller cracks, crevices, runs, depressions, etc., can be filled almost instantaneous because the thermal blanket(s) have allowed molten material to come very close to all surfaces of the mold prior to pressurization.

In some cases, for example, all the contours or features of a mold may not need to be exactly matched by a thermal blanket. For example, in some cases, it may be sufficient to approximately match the contours of mold cavity so that the molten material is closer to, or as close as possible to, the desired end shape for the casting prior to pressurization. This can lessen the distance that the molten material needs to flow for smaller features and may prevent sections of the mold cavity from solidifying early. In some cases, approximately covering features with a thermal blanket can thus reduce or minimize the "uncovered" travel distances over which the molten material may be more likely to prematurely solidify. In some cases, a thermal blanket may be used to cover thinner sections of a mold that are used as runners or flow lines to thicker sections of the mold. Accordingly, the blanket may keep material flow through the thinner sections from prematurely freezing and clogging before thicker sections of the mold are filled.

In some cases, use of one or more thermal blankets may provide a casting process in which the casting molds can be operated at a colder temperature than might otherwise be used. Colder mold temperatures can, in turn, provide faster solidification times which may lead to improved solidification of the molten materials (e.g., finer grains, few long grains, fewer dendrite growths, etc.). In some cases, a casting method using one or more thermal blankets to line a mold cavity may operate with the molds at room temperature (e.g., about 20° C.) as opposed to temperatures closer to 250° C., which are typical for metal casting processes. Accordingly, some embodiments can provide material flow characteristics within a mold at room temperature that are substantially the same as characteristics typical of molds run at temperature closer to 250 C, while also providing higher solidification or cooling rates.

According to some embodiments, use of one or more thermal blankets may extend the dwell time of a molten metal. As just one example, in some cases, positioning a thermal blanket within a mold cavity may lead to a dwell time on the order of minutes rather than the order of seconds, milliseconds, and smaller units. According to some embodiments, using a thermal blanket during a casting process may provide dwell times of 30 seconds or more. In some cases a thermal blanket may provide a dwell time of between about 1 minute and about 10 minutes. In some cases, the dwell time provided may be between about 3 and 8 minutes. In some cases the dwell time may be about 4 minutes or about 5 or more minutes. In some cases the thickness of the thermal blanket can be adjusted (e.g., by selecting fewer or more sublayers of the thermally insulating material) to adjust the dwell time.

In some cases, an increased dwell time can provide advantages for different casting methods, including the casting of composite materials. For example, a prolonged or increased dwell time may provide added time that is useful for arranging tiles, inserts, performs, and other types of objects within the mold cavity during the casting process. With some past methods, multiple people may be needed to insert materials into a composite casting because of the very quick solidification rates. In contrast, use of a thermal blanket may require fewer people and/or provide dwell time for increasing the accuracy of preform positions, ensuring performs are distributed with spacing as desired, etc. This can be useful for casting high performance materials and may make it easier to selectively change the performance of a casting by tailoring properties of the casting during the increased dwell time.

In some cases, an increased dwell time may allow the initial pouring of molten material and then arranging of one or more objects within the cavity that are meant to be encapsulated by the material. After satisfactorily arranging the objects, in some cases pressure may be applied to finish the casting process and push the molten material into all section so the mold cavity that it was previously isolated from by the thermal blanket. Thus, it should be appreciated that an increased dwell time can be useful for casting composite materials because it provides a longer period during which different objects (e.g., inserts, ceramic preform layers with different densities, etc.) can be arranged in order to tailor the properties of the final casting.

According to some embodiments, use of one or more thermal blankets may provide an ability to effectively modify the thermal conductivity of one or more die walls. As just one example, in some cases at least a portion of a thermal blanket may be positioned within a mold cavity against one or more walls of the mold. Placing the thermal blanket against the selected mold walls insulates that section of the mold wall, thus changing the thermal conductivity profile of the mold walls. As molten material is introduced into a mold with such an arranged blanket, the molten material will undergo different thermal shifts depending upon whether the material comes into contact with a bare mold wall or a portion of a mold wall that is insulated with a thermal blanket. Thus, insulating one or more walls or portions of walls of a mold can promote directional solidification within the casting as portions of the molten material (e.g., those contacting bare portions of a mold wall) lose heat faster than other portions (e.g., those contacting thermal blankets). Thermal blankets of various sizes can thus be used to selectively insulate different portions of a mold in order to solidify different portions of the casting at different times and/or rates, which can be beneficial for generating desired material properties in a cast article.

According to some embodiments, a first thermal blanket may be positioned within a mold cavity to substantially line the cavity. After pouring molten material into the cavity, an additional thermal blanket may be placed on top of the molten material before closing and pressurizing the mold. Thus, the molten material is in effect inside an insulative envelope that reduces the likelihood of premature solidification at any one spot, even near an open end of a mold that is only sealed and pressurized after filling the rest of the mold cavity.

According to some embodiments, a thermal blanket may be used in many different types of casting methods as mentioned above. In some cases, a thermal blanket may be positioned in any useful position and/or in contact with any mold surface, preform or insert surface, or between different types of molten materials.

As used herein, the term preform is used to reference a material that can be infiltrated with a molten material. Also, the term insert is used herein to indicate a piece of material that would not be infiltrated. For example, an insert might be solid material like a piece of steel. According to some embodiments, a preform can be used as a thermal isolator, e.g., by placing the preform underneath a tile or insert. In some cases, a preform can have features that hold the spacing between hot (e.g., heated) tiles and a cold die cavity.

As shown in some of the Figures, multi-level laminates including the same and/or different molten materials may be created by positioning thermal blankets between the different materials. According to some embodiments, the molten material(s) introduced into a mold cavity and into contact with a thermal blanket may be any suitable material used in methods for casting articles. In some cases, a molten material may include at least one metal (e.g., in elemental, compound, or alloy forms). In some cases, one or more metals including aluminum, magnesium, and/or steel may be used. Further, in some cases a molten material may also include a particulate material. One example of such a material is Duralcan, which includes SiC particles suspended in aluminum.

According to some embodiments, use of one or more thermal blankets for thermal isolation within a mold cavity may also include isolating one or more insert from the molten material. Accordingly, the performance of the solidified material can be improved while also limiting the duration of contact between a molten material and an insert. Accordingly, an insert and/or preform isolated by a thermal blanket may not be subject to as high of heat conditions as would otherwise be encountered. This may reduce the instances when an insert is degraded by unfavorable conditions. For example, some embodiments may only provide a short amount of contact time between a high temperature mold material and sometimes sensitive inserts prior to solidification. As one example, in some cases a thermal blanket may be used to protect a wrought or cast plate made from magnesium, aluminum and/or titanium that is inserted into the mold cavity.

FIG. 6 is a flow diagram illustrating a method 600 for casting an article according to an embodiment. The method generally includes providing 602 a thermal blanket, positioning 604 at least a portion of the thermal blanket within a mold cavity of a mold, and then introducing 606 a molten material into the mold cavity and into contact with a first surface of the thermal blanket until the molten material fills the mold cavity.

FIG. 7 is a flow diagram illustrating a method 700 for casting an article according to an embodiment. The method generally includes providing 702 a thermal blanket, positioning 704 at least a portion of the thermal blanket within a mold cavity of a mold, positioning 706 one or more preforms and/or inserts within the mold cavity, and then introducing 708 a molten material into the mold cavity and into contact with a first surface of the thermal blanket, but not the preforms and/or inserts, until the molten material fills the mold cavity.

FIG. 8 is a flow diagram illustrating a method 800 for casting an article according to an embodiment. The method generally includes providing 802 a first thermal blanket and a second thermal blanket, positioning 804 at least a portion of the first thermal blanket within a mold cavity of a mold, and introducing 806 a first molten material into the mold cavity and into contact with a first surface of the first thermal blanket. The method also includes positioning 808 at least a portion of the second thermal blanket within the mold cavity, and introducing 810 a second molten material into the mold cavity and into contact with a first surface of the second thermal blanket.

FIG. 9 is a flow diagram illustrating a method 900 for casting an article according to an embodiment. The method generally includes providing 902 a thermal blanket and positioning 904 at least a portion of the thermal blanket within a mold cavity of a mold. The method then includes introducing 906 a first molten material into the mold cavity and into contact with a first surface of the thermal blanket. The method also includes applying pressure 908 at least until the molten material solidifies. Another step in the method 900 includes infiltrating 910 the thermal blanket with the molten material when the pressure is applied 908 to the molten material.

Figure 10:
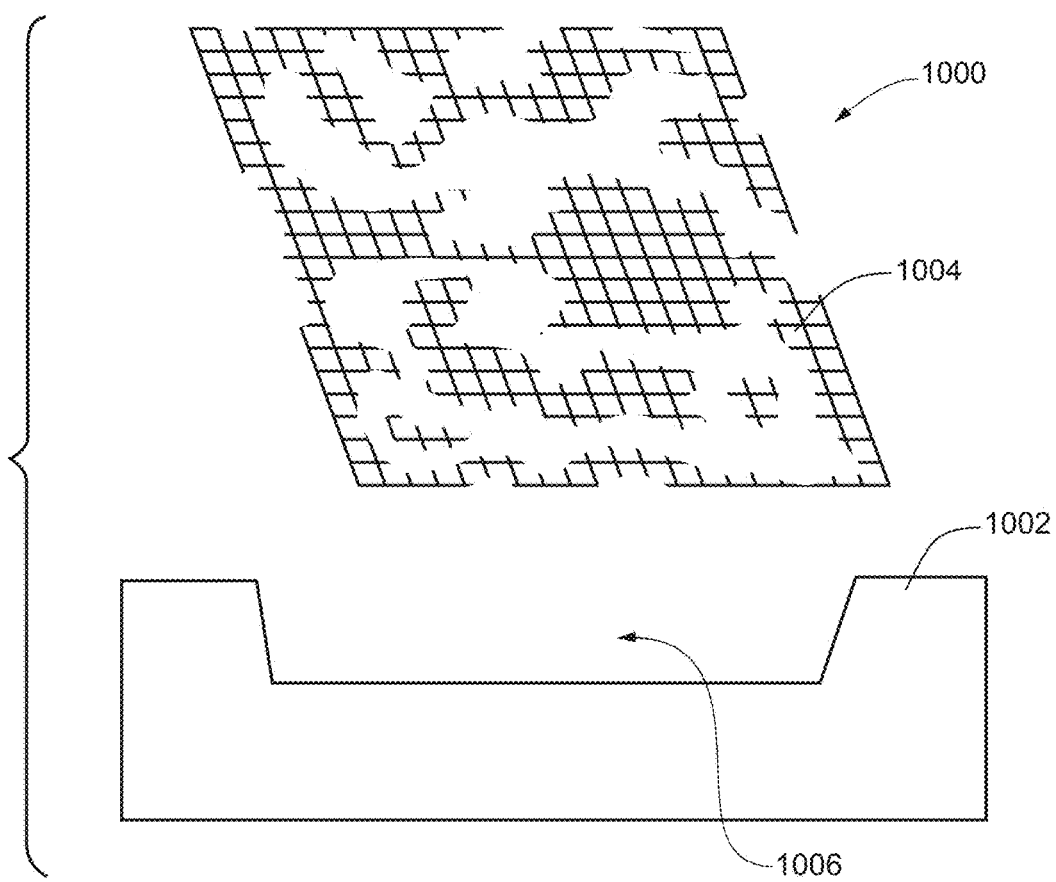
FIG. 10 is a schematic representation of a casting system including a mold and a thermal blanket according to an embodiment.
Figure 11A:
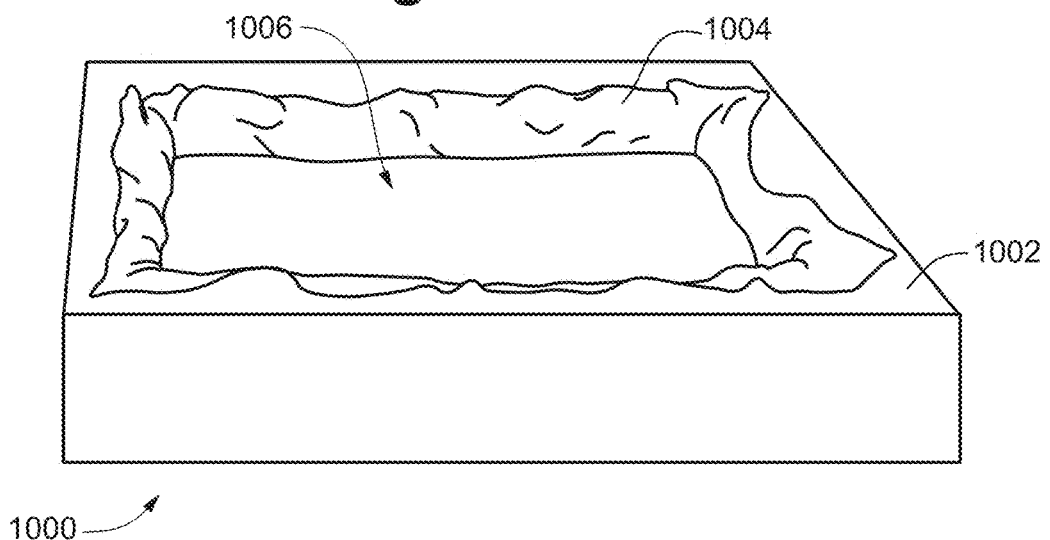
FIG. 11A is a perspective view of a thermal blanket positioned within a cavity of a mold according to an embodiment.
Figure 11B:
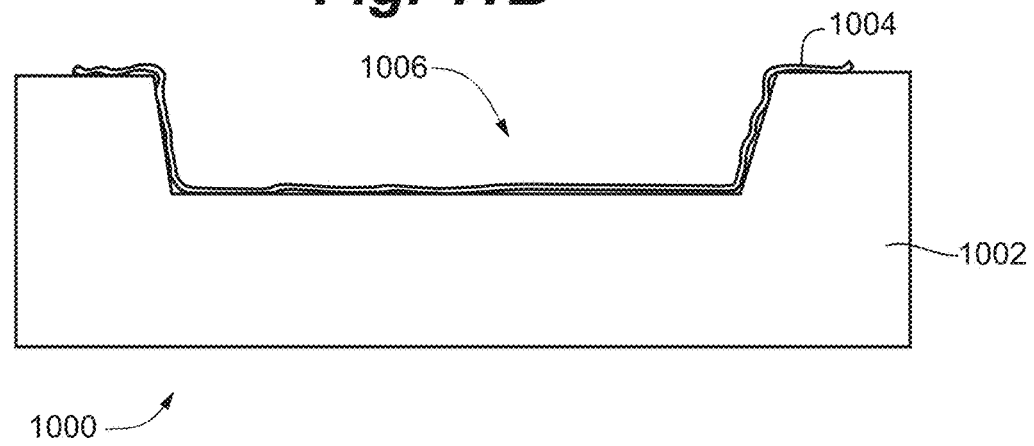
FIG. 11B is a side cross-sectional view of the thermal blanket and mold in FIG. 11A.

FIGS. 10-14 depict a series of steps in a method for casting an article according to an embodiment. FIG. 10 is a schematic representation of a casting system 1000 including a mold 1002 and a thermal blanket 1004 according to an embodiment. FIG. 11A is a perspective view of the thermal blanket 1004 positioned within a cavity 1006 of the mold 1002 according to an embodiment. For example, in this case, the thermal blanket 1004 is pressed into the corners of the mold cavity to substantially line the interior surfaces of the mold cavity 1006 and excess portions of the blanket 1004 simply extend from the mold cavity. FIG. 11B is a side cross-sectional view of the thermal blanket 1004 and mold 1002 in FIG. 11A.

Figure 12:
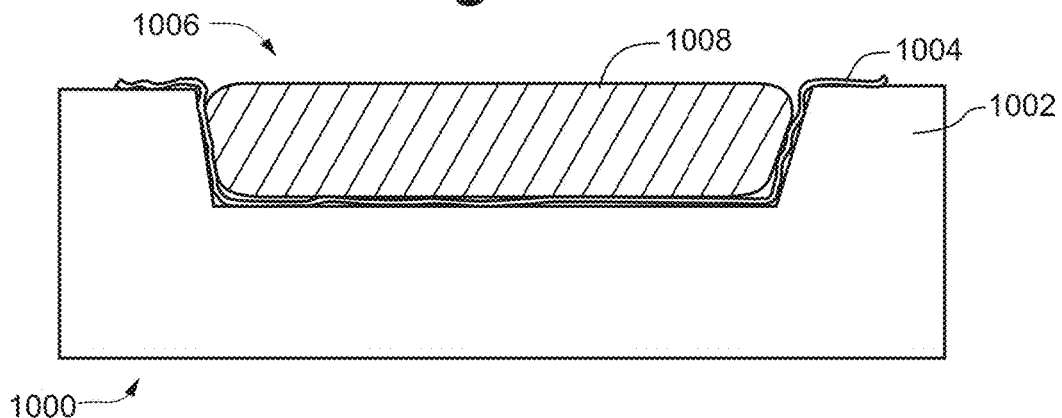
FIG. 12 is a side cross-sectional view of a thermal blanket positioned between a mold and a molten material according to an embodiment.

FIG. 12 illustrates the addition of a molten material 1008 into the cavity 1006. As can be seen from the side cross-sectional view, the thermal blanket 1004 is positioned between the mold 1002 and the molten material 1008 and thus thermally isolates the mold 1002 from the molten material 1008. As can be seen, the thermal blanket 1004 acts to create a holding pond that holds initial portions of the molten material 1008 in isolation from the mold 1002 until substantially the entire mold cavity 1006 is filled.

Figure 13:
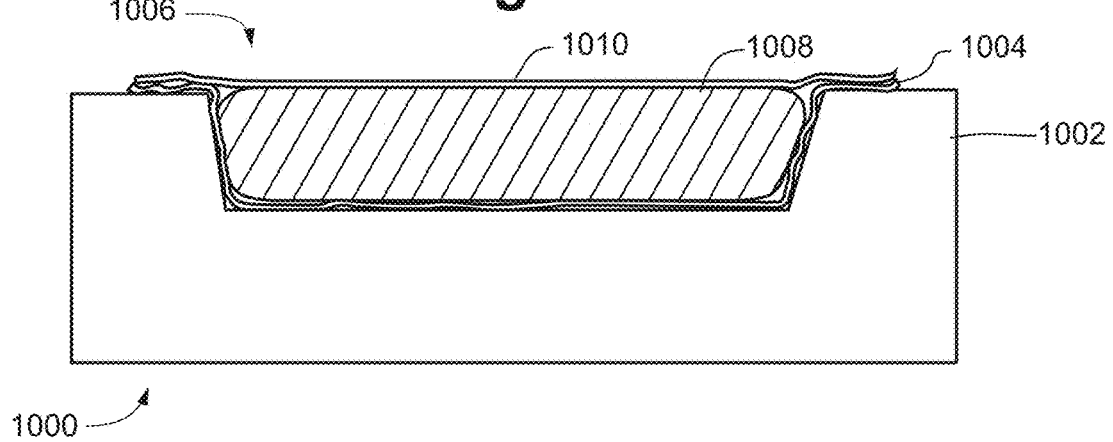
FIG. 13 is a side cross-sectional view of a molten material positioned within a mold cavity and between two thermal blankets according to an embodiment.

Turning to FIG. 13, in some cases, an additional thermal blanket 1010 may be positioned on top of the molten material 1008. FIG. 13 is a side cross-sectional view of the molten material 1008 positioned within a mold cavity and between the two thermal blankets 1004, 1010 according to an embodiment.

Figure 14:
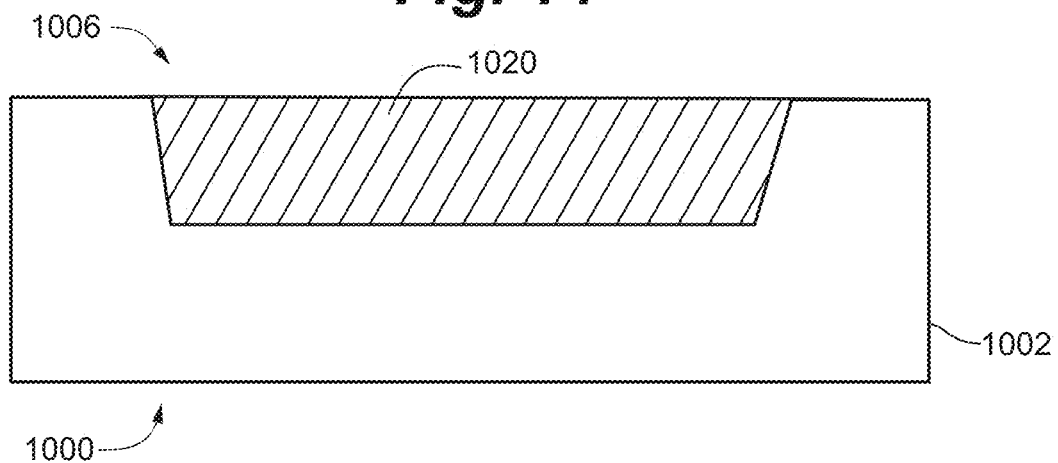
FIG. 14 is a side cross-sectional view of a casting after solidification according to an embodiment.

FIG. 14 is a side cross-sectional view of a finished casting 1020 sitting within the mold cavity 1006 of the mold 1002 after solidification according to an embodiment. For example, a top portion of the mold 1002 (not shown) may in some cases be pressed against the bottom portion 1002, thus applying pressure to the molten material 1008 to begin solidification. As shown in FIG. 14, in some cases applying pressure and finishing the casting produces a cast article 1020 without a noticeable presence of the thermal blankets 1004, 1010 that were used in the casting process. As discussed above, in some cases applying pressure may force the molten material 1008 to infiltrate the blankets 1004, 1010 and to begin breaking apart the blankets.

Figure 15:
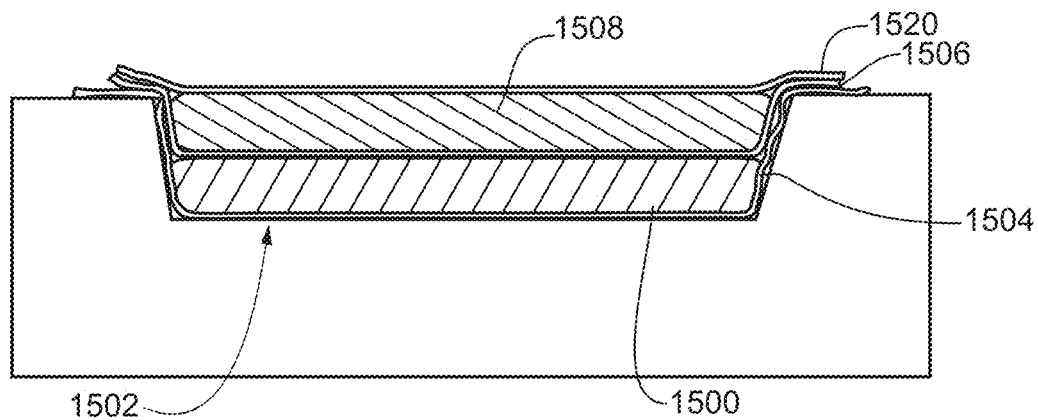
FIG. 15 is a side cross-sectional view of a first molten material positioned within a mold cavity between two thermal blankets and a second molten material positioned within the mold on top of the first molten material but between two thermal blankets according to an embodiment.

FIG. 15 is a side cross-sectional view of a first molten material 1500 positioned within a mold cavity 1502 between two thermal blankets 1504, 1506. The example also shows a second molten material 1508 positioned within the mold cavity 1502 on top of the first molten material 1500 but between two thermal blankets 1506, 1520. Accordingly, the use of three thermal blankets in this case can allow the creation of a multi-level laminate structure. In some cases the first and second molten materials may be the same, while in some cases they may be different. As will be appreciated, depending upon the size of the mold and the thickness of the layers, several thermal blankets could be used at once to cast an article having several layers.

Figure 16A:
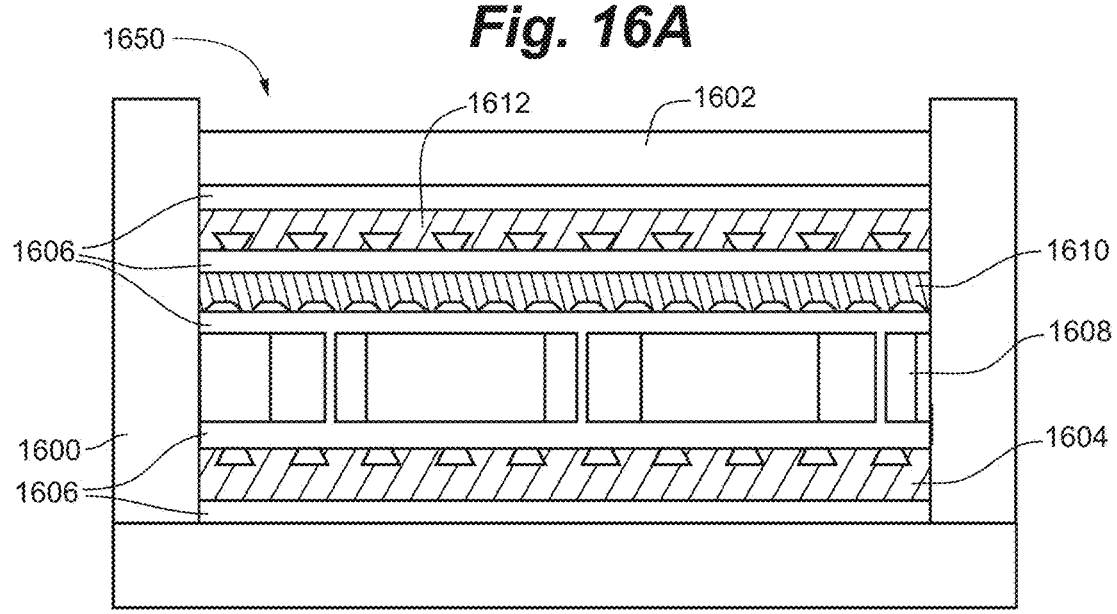
FIG. 16A is a schematic side cross-sectional view of a casting prior to applying pressure to a mold according to an embodiment.

Turning to FIG. 16A, an example of a multi-layer high performance composite casting is shown in a schematic side cross-sectional view of a casting 1650 prior to applying pressure to a mold according to an embodiment. As illustrated, in some cases a thermal blanket 1606 may be positioned between each different adjacent layer, although this is not required and may not be used in some cases. The casting is shown within a mold 1900 that includes a bottom wall and side walls, as well as a moving top wall that allows pressurization of the casting in a direct squeeze casting embodiment. A wide variety of inserts, preforms and other materials may be placed within the casting 1650 to enhance the composite performance. For example, in this case the casting 1650 includes a bottom insert or plate 1604 placed directly on a bottom thermal blanket. Next a thermal blanket is positioned over the plate 1604. A plurality of tiles and/or inserts 1608 can then be positioned on the thermal blanket and another preform 1610 on top of that blanket. Finally another insert or plate 1610 is included between two additional thermal blankets at the top of the casting.

Figure 16B:
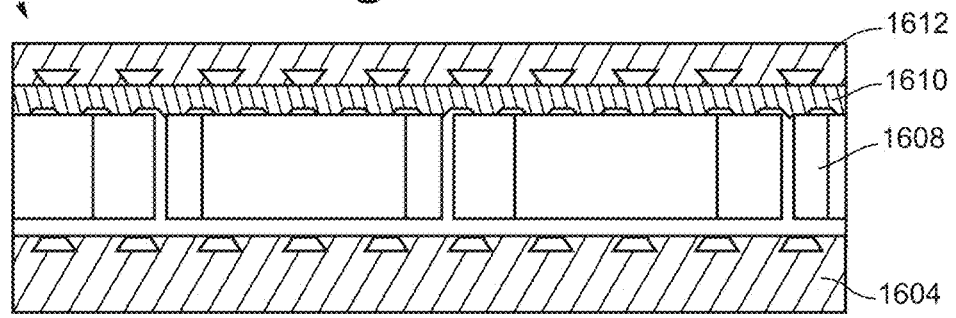
FIG. 16B is a schematic side cross-sectional view of the casting in FIG. 16A after applying pressure to the mold and solidification according to an embodiment.

FIG. 16A shows that the mold 1600 includes a movable portion or plunger 1602 that can be actuated to apply pressure to the molten materials within the cavity. Upon applying pressure in this case, the thermal blankets 1606 are broken up and substantially disintegrated as discussed above. FIG. 16B is a schematic side cross-sectional view of the casting 1670 in FIG. 16A after applying pressure to the mold and solidification according to an embodiment. As can be seen, the thermal blankets 1606 have virtually disappeared.

Figure 17:
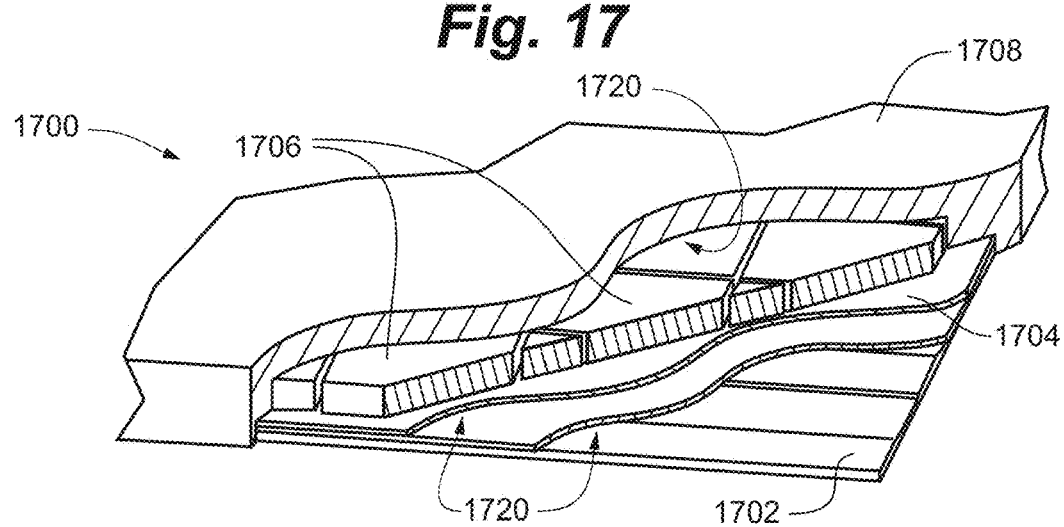
FIG. 17 is a perspective, partial sectional view of a casting according to an embodiment.

FIG. 17 is a perspective, partial sectional view of a casting 1700 according to an embodiment. The sectional view of the casting illustrates the multiple layers of the casting 1700, which include a low-density preform 1702 at the bottom, a carbon fiber weave 1704 on top of the preform 1702, several ceramic tiles 1706 on top of the fiber weave 1704, and a layer of metal alloy 1708 encompassing, enveloping, and infiltrating the entire casting 1700. Although not shown in FIG. 17, in some cases one or more thermal blankets may be positioned between the one or more layers (e.g., see reference number 1720) in order to isolate the layers during casting.

Figure 18:
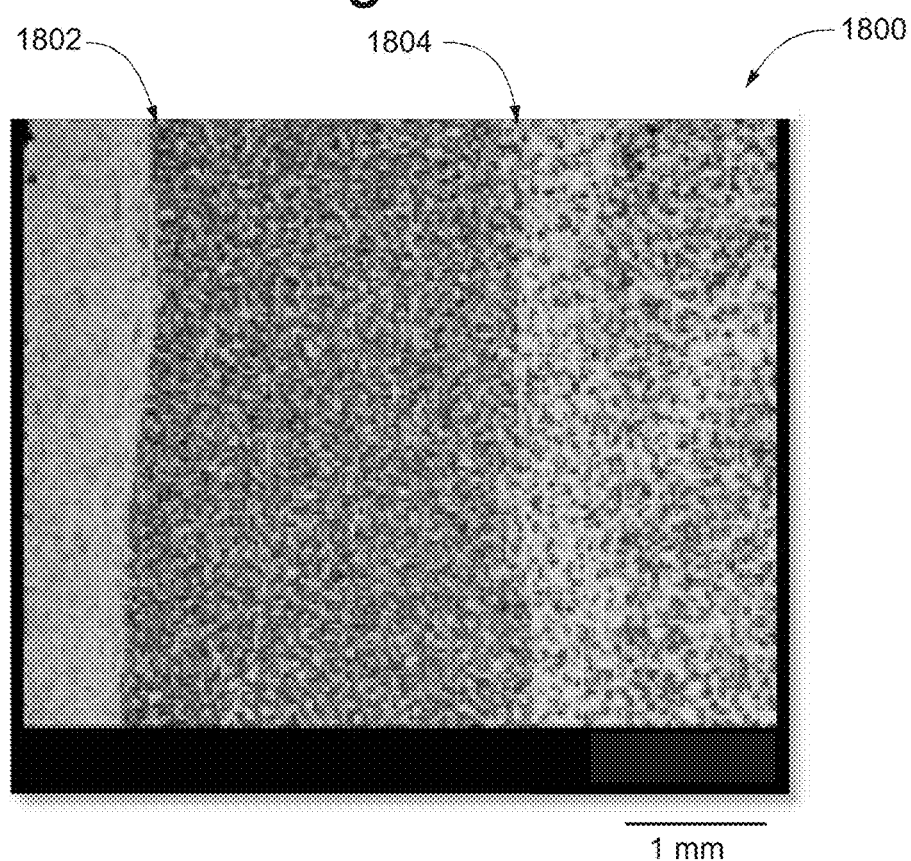
FIG. 18 is a side cross-sectional view of a casting according to an embodiment.

FIG. 18 is a side cross-sectional view of a casting 1800 according to an embodiment. As can be seen, the casting 1800 is formed from three types of materials. Although not seen, in some cases a first thermal blanket may be placed at position 1802, and a second thermal blanket may be placed at position 1804 in order to isolate the layers during casting.

According to some embodiments a casting method for an article includes placing a thermal blanket in a mold cavity. The thermal blanket lines the sides of the mold cavity and in some cases lines and/or envelopes certain preforms or inserts. When a molten material is introduced into the mold cavity and the mold is closed, there is an extended dwell period realized prior to pressurization and solidification of the molten material to form a cast article.

In some cases positioning of a preform within the mold cavity may ensure that the thermal blanket isolates some or all of the preform from the mold cavity wall.

In some cases positioning of the thermal blanket comprises lining the mold cavity, and in some cases casting inserts and preforms, with the thermal blanket to substantially isolate the separate mold entities from the molten material.

In some cases the preform is a porous preform, a variable density preform or a porous variable density preform wherein the preforms are suitable for infiltration casting. A preform may contain for example, ceramic particles, continuous or discontinuous ceramic fibers or a combination thereof. In addition, the preform can also be used as positioning thermal isolator for exacting placement of casting inserts.

In some cases a thermal blanket comprises ceramic based fibers and the thermal blanket is thermally processed and compressed to achieved a desired bulk density that can range from about 6#/Ft$^3$ to about 12#/Ft$^3$.

In some cases the thermal blanket and a preform act to tailor the material structure through the cross section. In some cases this can be used to create a functional gradient through the material thickness with tailor-able material properties.

According to some embodiments, a casting method for an article includes steps in the process wherein a first thermal blanket is placed in the mold cavity; and wherein the first thermal blankets lines the sides of the mold cavity; and wherein a first molten material is introduced into at least a portion of the mold cavity; and wherein a second thermal blanket is placed over the first molten material; and wherein a second molten material is introduced on top of the second thermal blanket; and wherein the second molten material is the same as the first molten material; and wherein this multi-level lamination can be repeated; and wherein the mold is closed; and wherein there is an extended dwell period realized prior to pressurization and solidification of the molten material to form a cast article.

According to some embodiments, a casting method for an article includes steps in the process wherein a first thermal blanket is placed in the mold cavity; and wherein the first thermal blankets lines the sides of the mold cavity; and wherein a first molten material is introduced into at least a portion of the mold cavity; and wherein a second thermal blanket is placed over the first molten material; and wherein a second molten material is introduced on top of the second thermal blanket; and wherein the each molten material laminate level is unique and specific; and wherein this multi-level lamination can be repeated; and wherein the mold is closed; and wherein there is an extended dwell period realized prior to pressurization and solidification of the molten material to form a cast article.

Thus, embodiments of the invention are disclosed. Although examples have been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention and the scope of the appended claims.

What is claimed is:

1. A system for casting an article, comprising:
    a mold defining a mold cavity comprising an inner surface; and
    at least one thermal blanket, the at least one thermal blanket comprising a layer of thermally insulating material;
    said layer of thermally insulating material further comprising at least partially sintered ceramic fibers;
    wherein the at least one thermal blanket is configured to isolate a molten material introduced into the mold cavity from the inner surface of the mold cavity such that the molten material within the mold cavity remains in a molten state at least until the molten material fills the mold cavity; and
    wherein the at least one thermal blanket is positionable in one piece within the mold cavity prior to casting.

2. The system of claim 1 wherein the at least one thermal blanket is configured to isolate the molten material from the inner surface of the mold cavity until pressure is applied to the molten material.

3. The system of claim 1, wherein the at least one thermal blanket is configured to substantially disintegrate when pressure is applied to the molten material.

4. The system of claim 1, further comprising a plurality of thermal blankets.

5. The system of claim 1, wherein the thermal blanket consists essentially of the layer of thermally insulating material.

6. The system of claim 1, wherein the thermal blanket consists of the layer of thermally insulating material.

7. The system of claim 1, wherein the thermally insulating material comprises a ceramic fiber material.

8. The system of claim 1, wherein the at least partially sintered ceramic fiber material comprises aluminum oxide and/or silica.

9. The system of claim 1, wherein the layer of thermally insulating material has a density of between about 6 lbs/ft$^3$ and about 12 lbs/ft$^3$.

10. The system of claim 9, wherein the density of the layer of thermally insulating material is about 9 lbs/ft$^3$.

11. The system of claim 1, wherein the at least one layer of thermally insulating material has a thickness of less than about 0.0625 inches.

12. The system of claim 1, wherein the at least one layer of thermally insulating material has a thickness of between about 0.0001 inches and about 0.0625 inches.

13. The system of claim 12, wherein the thickness of the at least one layer of thermally insulating material is between about 0.03 inches and about 0.06 inches.

14. The system of claim 1, wherein the at least one layer of thermally insulating material has a thickness of about 0.03 inches.

15. The system of claim 1, further comprising a pressure injection system configured to introduce the molten material into the mold cavity under pressure.

16. The system of claim 1, wherein the mold comprises a first part and a removable second part that define the mold cavity when the removable second part is positioned adjacent the first part.

17. The system of claim 1, wherein the mold and the mold cavity are configured for gravity casting.

18. The system of claim 1, further comprising a shot sleeve configured to receive the molten material and a plunger configured to press the molten material from the shot sleeve into the mold cavity under pressure.

19. The system of claim 1, wherein the layer of thermally insulating material comprises a compressed insulating material.

20. The system of claim 1, wherein the molten material remaining in the molten state at least until the molten material fills the mold cavity comprises the molten material remaining at a temperature above a liquidus temperature for the molten material at least until the molten material fills the mold cavity.

21. A system for casting an article, the system comprising:
a mold defining a mold cavity having an inner surface; and
at least one thermal blanket, the at least one thermal blanket comprising a layer of compressed thermally insulating material;
said layer of thermally insulating material further comprising at least partially sintered ceramic fibers;
wherein the at least one thermal blanket is configured to isolate a molten material introduced into the mold cavity from the inner surface of the mold cavity for a dwell time of at least 30 seconds; and
wherein the at least one thermal blanket is positionable in one piece within the mold cavity prior to casting.

* * * * *